(12) United States Patent
Gatti et al.

(10) Patent No.: US 6,838,495 B2
(45) Date of Patent: Jan. 4, 2005

(54) RUBBER COMPOSITION COMPRISING COMPOSITE PIGMENT

(76) Inventors: Louis Frank Gatti, 5 Kelty Ct., Newark, DE (US) 19702; Mark Edward Wozniak, 1103 Andreas Dr., Bel Air, MD (US) 21015; Fitzgerald Alphanso Sinclair, 326 Brandon Dr., Bear, DE (US) 21078; William C. Fultz, 1114 Telegraph Rd., Rising Sun, MD (US) 21911

( * ) Notice: Subject to any disclaimer, the term of this patent is extended or adjusted under 35 U.S.C. 154(b) by 0 days.

(21) Appl. No.: 10/346,669

(22) Filed: Jan. 17, 2003

(65) Prior Publication Data

US 2004/0143050 A1 Jul. 22, 2004

(51) Int. Cl.$^7$ ................................................ C08K 9/00
(52) U.S. Cl. ........................ 523/209; 524/423; 524/430; 524/432
(58) Field of Search ........................ 523/209; 524/423, 524/430, 432

(56) References Cited

U.S. PATENT DOCUMENTS

| | | | |
|---|---|---|---|
| 4,334,933 A | 6/1982 | Abe et al. | |
| 4,551,497 A | 11/1985 | Shinozuka et al. | |
| 5,100,947 A | 3/1992 | Puydak et al. | |
| 5,227,425 A | 7/1993 | Rauline | |
| 5,298,328 A | 3/1994 | Abe et al. | |
| 5,340,393 A | 8/1994 | Jacobson | |
| 5,891,949 A | 4/1999 | Evans et al. | |
| 5,929,156 A | 7/1999 | Fultz et al. | |
| 6,008,295 A | 12/1999 | Takeichi et al. | |
| 6,054,220 A | 4/2000 | Mroz | |
| 6,087,435 A | 7/2000 | Nakano et al. | |
| 6,093,768 A | 7/2000 | Nakano et al. | |
| 6,180,710 B1 | 1/2001 | Hergenrother et al. | |
| 6,194,070 B1 | 2/2001 | Lynch et al. | |
| 6,274,662 B1 | 8/2001 | Lynch et al. | |
| 6,380,294 B1 | 4/2002 | Babinec et al. | |
| 6,413,638 B1 | 7/2002 | Mager et al. | |
| 2002/0107316 A1 | 8/2002 | Bice et al. | |
| 2002/0115747 A1 | 8/2002 | Feldheim et al. | |
| 2002/0128370 A1 | 9/2002 | Colvin et al. | |
| 2002/0143096 A1 | 10/2002 | Amaddeo et al. | |

FOREIGN PATENT DOCUMENTS

JP     HEI 4 309-566     11/1992

*Primary Examiner*—Peter D. Mulcahy
(74) *Attorney, Agent, or Firm*—Carlos Nieves; David Mitchell Goodrich

(57) ABSTRACT

A Rubber Composition is provided that comprises a rubber and a composite pigment composition, with the composite pigment including a dense inorganic material and silica. The pigment composition is characterized by a CTAB surface area of greater than about 20 m$^2$/g; a BET surface area of greater than about 25 m$^2$/g; and a density of greater than about 2.5 g/cm$^3$.

14 Claims, 1 Drawing Sheet

Dynamic Mechanical Properties
for Rubber Compositions of Table XII

RUBBER COMPOSITION COMPRISING COMPOSITE PIGMENT

BACKGROUND OF THE INVENTION

Natural and synthetic Rubber Compositions are among the world's most widely manufactured materials. While rubber and other elastomers are used in a remarkably diverse range of products, for both industrial and consumer applications, a disproportionately large share of manufactured rubber is made into tire components.

One of the most important ingredients of any Rubber Composition (besides the rubber or elastomer material itself) is the filler. Fillers are added to a Rubber Composition or elastomer primarily to improve the rubber's processability, strength, modulus, durability and to control the rubber's hysteresis properties (i.e., those properties relating to energy absorption such as wet traction and rolling resistance), and also reduce the cost of the Rubber Composition. Thus, the choice of fillers is very important, because of the effect that they have on the characteristics and properties of the Rubber Composition.

In the case of Rubber Compositions for the tire industry, which are predominantly synthetic Rubber Compositions, there are several rubber characteristics relevant to tire performance, that are strongly affected by the choice of filler. Choosing a filler is difficult, because each separate filler enhances certain tire-performance related characteristics while compromising others. For example, carbon black is the most widely used filler in Rubber Compositions for the tire industry. Rubber Compositions incorporating carbon black have considerably improved processability during manufacture, and tires made from carbon black-containing Rubber Compositions have desirable modulus and durability performance.

Additionally, the use of carbon black filler in Rubber Compositions has a significant effect on tire performance properties because the inclusion of the carbon black increases the hysteresis of the tire tread. Specifically, the increased hysteresis of the tire tread increases wet and dry traction; increases rolling resistance (and thus decreasing fuel efficiency); and increases heat generation (and this higher heat generated during service can reduce the durability of the tire tread). Because of these disadvantages associated with the use of carbon black, and because of a desire for a Rubber Composition for use as a tire tread that has an excellent balance of performance properties, there is a need in the art for Rubber Compositions for use in tires that include alternative filler materials capable of providing the desired balance of performance properties.

An alternative filler material that has been subjected to considerable recent investigation, and which is promising for use in Rubber Compositions for the tire industry, is precipitated "highly-dispersible" silica. Particularly useful is coupled silica in which precipitated highly-dispersible silica is combined with a silane coupling agent (coupling agents provide connective adhesion between the silica filler and the polymer chains of the rubber). Coupled silica offers several advantages over non-coupled silica: tire treads made from coupled silica-containing rubber have modulus and durability properties comparable to tire treads made from carbon black-containing rubber. Moreover, the use of coupled precipitated highly-dispersible silica enhances the hysteresis-related properties such as increasing the wet traction, lowering the rolling resistance (and thereby improving fuel efficiency) and lowering the heat generated during service (and thereby improving the tire durability) when compared to carbon black used alone.

However, these desirable attributes delivered by the use of a coupled silica filler are in turn offset by certain disadvantages. Particularly, combining silica with coupling agents complicates the mixing process and delays manufacture because sufficient time must pass to allow for the completion of the reaction between the coupling agents and the silica. Additionally, the reaction of certain silane coupling agents (such as alkoxysilanes) leads to ethanol emissions into the atmosphere. Because such emissions are strictly regulated, manufacturing facilities using silane coupling agents must be equipped with equipment to control the emissions, further increasing costs.

Still other alternative fillers for Rubber Compositions to be used in the tire industry have been proposed, but these alternative filler materials are not themselves without disadvantages. For example, while not an acceptable substitute on its own for carbon black, it has been suggested that a portion of carbon black filler in an elastomer or Rubber Composition could be replaced with barium sulfate. Barium sulfate's density would seem to make it an ideal filler (when blended with carbon black) in Rubber Compositions intended for use in making tires, because important tire performance characteristics such as rolling resistance and traction performance are related to the average density of the filler materials. However, because barium sulfate has neither sufficient surface area nor sufficient surface chemistry to interact with the rubber matrix, the barium sulfate fails to provide any reinforcement benefits, so that barium sulfate filler-containing Rubber Compositions do not provide sufficient abrasion resistance and strength to be included in Rubber Compositions to manufacture into tire treads.

Given the foregoing, there is a continuing need for Rubber Compositions that incorporate new filler materials and can be formed into tires with excellent performance characteristics. Such filler materials should be capable of being easily incorporated into a Rubber Composition without complicating or slowing down the manufacturing process. Additionally, such fillers should preferably reduce the amount of additional chemical compounds, like coupling agents, which are necessary for producing tires having satisfactory performance standards.

BRIEF SUMMARY OF THE INVENTION

The invention includes a Rubber Composition comprising a rubber and a composite pigment composition. The composite pigment includes a dense inorganic material and silica, and has a CTAB surface area of greater than about 20 $m^2/g$; a BET surface area of greater than about 25 $m^2/g$; and a density of greater than about 2.5 $g/cm^3$.

The invention also includes a pneumatic tire including a tread, the tread containing a Rubber Composition, and the Rubber Composition containing a rubber and a composite pigment composition. The composite pigment includes a dense inorganic material and silica, and has a CTAB surface area of greater than about 20 $m^2/g$; a BET surface area of greater than about 25 $m^2/g$; and a density of greater than about 2.5 $g/cm^3$.

BRIEF DESCRIPTION OF THE SEVERAL VIEWS OF THE DRAWING

The foregoing summary, as well as the following detailed description of preferred embodiments of the invention, will be better understood when read in conjunction with the appended drawing. It should be understood, however, that the invention is not limited to the precise relationships and instrumentalities shown. In the drawing.

DETAILED DESCRIPTION OF THE INVENTION

Figure 1:
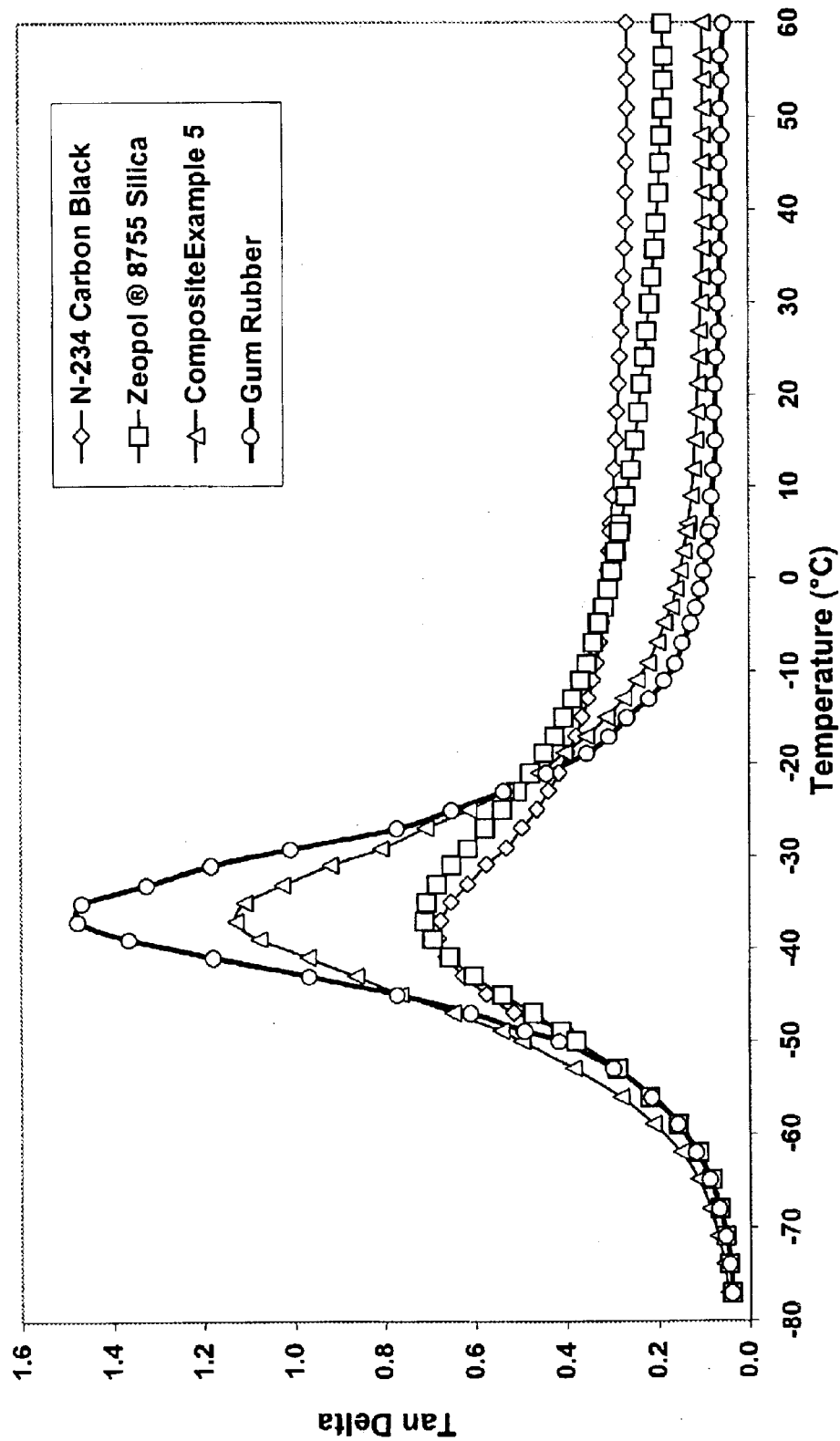
FIG. 1 is a graph illustrating the relationship between the value of Tan and temperature measured for several different Rubber Compositions.

All parts, percentages and ratios used herein are expressed by weight unless otherwise specified. All documents cited herein are incorporated by reference.

All parts, percentages and ratios used herein are expressed by weight unless otherwise specified. All documents cited herein are incorporated by reference. The following describes preferred embodiments of the present invention, which provides a Rubber Composition comprising a composite pigment. Rubber Compositions prepared in accordance with the present invention are particularly suitable for the manufacture of treads of tires intended for passenger cars, all-terrain, four-by-four light vehicles, pickup trucks, race cars, and motorcycles. Treads having the composition in accordance with the invention can be used for the manufacture of tires or for the recapping of worn tires.

The present invention relates to Rubber Compositions composed of a rubber elastomer and a composite pigment material. The composite pigment is composed of silica and a dense organic material and has a CTAB surface area of greater than about 20 $m^2/g$; a BET surface area of greater than about 25 $m^2/g$; and a density of greater than about 2.5 $g/cm^3$. Preferably the silica is deposited as a coating on a substrate (or "core") of the inorganic material. When so deposited, the silica forms in agglomerations around the inner core or substrate creating an irregular surface profile, which has a high porosity and accordingly a very high surface area.

Tires incorporating a blend of this composite pigment material and carbon black have excellent strength properties that are comparable or even superior to tires with conventional carbon black or silane coupled silica filler rubber compounds. Without being limited by theory, it is believed that this excellent strength performance is obtained by including precipitated amorphous silica, which can react with coupling agents, on the surface of a high-density inorganic core material.

Because of the hydroxyl groups located throughout the high surface area silica coating, a sufficiently high level of crosslinking is formed between the elastomer, the silane coupling agent and the silica coating, so that a Rubber Composition containing the present composite pigment material has strength properties comparable or superior to Rubber Compositions containing fillers such as uncoated barium sulfate and dense-phase silica coated barium sulfate. The improvement in the reinforcing properties obtained by using a high density filler (like the present composite pigment filler) allows for the formulation of a filler blend made from a combination of the present composite material, and carbon black, which offers comparable or superior wet traction performance, rolling resistance, and abrasion resistance (tire wear) than that obtained with silane coupled silica while at the same time reducing manufacturing costs associated with the use of silane coupled silica.

Additionally, the inorganic material used in the present invention has a sufficient density so that Rubber Compositions containing this filler can be made into tires that have enhanced rolling resistance and wet traction characteristics.

Thus, in the present invention, the composite pigment material has a silica coating that provides a high level of hydroxyl functionality to form cross-links with a coupling agent and the rubber elastomer material that forms the rubber matrix. Accordingly, the present invention also relates to a method for increasing the functionality of inorganic material. In this method, particles of the inorganic material are provided, and precipitated amorphous silica is deposited on the inorganic particles to increase the functionality of the inorganic particles.

A Rubber Composition containing an enhanced composite pigment filler (i.e., a composite pigment material having an increased functionality) will now be discussed in greater detail. Additionally, a method of providing this composite pigment filler by combining the aforementioned inorganic material and silica ingredients will be discussed. Finally, the ingredients themselves will be discussed in greater detail.

Although not meant to be limited in their application, the Rubber Compositions of the present invention are particularly useful in the tire industry. Today's pneumatic tires are made from several separate individual components that are combined together to form a tire. These components include the tread, various belts and cap plies, the side wall, the carcass, the beads, an inner liner, as well as other components. Several of these aforementioned components are themselves divided into several subcomponents. For example, the tread may be divided into two parts, an "inside" tread base facing the inside of the tire which adheres to the belt system, and an "external" tread cap on the exterior of the tire that contacts the road surface. The Rubber Compositions of the present invention is particularly useful in forming the exterior tread cap. Although the Rubber Composition may also be used to form a single, one-piece tread, and may also, if desired, be used to form the inside tread base.

Preferably the present Rubber Compositions incorporate a rubber elastomer that is a copolymer of a diene-based elastomer and a vinyl aromatic compound. Suitable diene-based elastomers include homopolymers and copolymers of monomers selected from isoprene, 1,3-butadiene, 2-methyl-1,3-butadiene, 2,3-di($C_1$-$C_5$-alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 2-chloro-1,3-butadiene, 1,3-pentadiene, 2,4-hexadiene, and such similar polymers. Suitable vinyl aromatic compounds are selected from styrene, ortho-, meta- and para-methylstyrene, vinyltoluene, para-tert-butylstyrene, methoxystyrenes, chlorostyrenes, vinylmesitylene, divinylbenzene, vinylnaphthalene, and such compounds. Styrene-butadiene rubber (SBR), natural rubber and butyl Rubber Compositions are all suitable for use.

Also suitable are 3,4 isoprene rubber, nitrile butadiene rubber, neoprene rubber, synthetic isoprene rubber, a styrene-isoprene-butadiene (SIBR) terpolymer rubber available from the Goodyear Tire and Rubber Company, Chemicals Division, Akron, Ohio), epoxidized natural rubber, a brominated paramethyl styrene isobutyl isoprene rubber that is sold by ExxonMobil (Houston, Tex.) under the name Exxpro. The present Rubber Compositions may be made from either emulsion or solution manufactured butadiene rubber and styrene butadiene rubber, and all of the aforementioned elastomers can be used either neat or in any rubber blends formulated by those of ordinary skill in the art.

The present Rubber Compositions also incorporate a composite pigment filler with enhanced hydroxyl functionality to form cross-links with a coupling agent and the rubber matrix. This composite pigment filler consists of particles of inorganic material upon which is deposited a precipitated amorphous silica, thereby increasing the functionality of the inorganic particles. Conventional techniques for preparing precipitated amorphous silica are suitable for use.

In a preferred manufacturing process, the composite pigment filler is prepared by first mixing together in a reactor an aqueous solution of an alkali metal silicate, such as sodium silicate, and, preferably, an alkali metal sulfate, such as sodium sulfate. Any suitable reactor equipped with mixing means adequate to ensure a homogeneous mixture may be used. The aqueous solution of an alkali metal silicate preferably has a concentration of about 1 wt % to about 35 wt %. The aqueous solution of an alkali metal sulfate preferably has a concentration of about 1 wt % to about 5 wt %.

The reactor is then heated to a temperature of between 60° C. and 95° C., preferably between 70° C. and 85° C. under constant stirring, after which the dense inorganic material (preferably in solid, particulate form) is added directly to the silicate/sulfate reactor batch to form a reactor mixture. The amount of inorganic material added at this step depends on the desired concentrations of silica and inorganic material in the composite pigment.

After the inorganic material is added, the reactor mixture is stirred for a period of time, of at least 5 minutes to fully disperse the inorganic material. After the stirring, an aqueous solution of acidulating agent or acid is then added to the reactor mixture, at a relatively constant rate until a first pH level of 6.5–10, such as a pH of 7.0 to 7.8 was reached.

The aqueous acidulating agent solution preferably has a concentration of acidulating agent of about 6 wt % to about 35 wt %, such as about 9.0 wt % to about 15 wt %. Suitable acidulating agents or acids include $H_2SO_4$, $H_3PO_4$, $HNO_3$, $HCl$, $HCO_2H$, $CH_3CO_2H$; sulfuric acid is preferred.

After the reactor mixture reaches its first pH level, the addition of the aqueous acidulating agent solution is stopped, and the reactor mixture heated to a temperature of between 83° C. and 95° C., preferably between 90° C. and 94° C. Alternately, a recirculating loop and recirculating pump can be utilized. In such cases, the recirculating loop is opened and the pump is turned on after a specified time measured from the beginning of acid addition, such as 5 to 15 minutes, such as 8 to 12 minutes. The mixing rate is decreased. When the reaction mixture reaches pH 8.5 to 9.0, the reaction mixture temperature is ramped up to the final reaction temperature of between 83° C. and 95° C., preferably between 90° C. and 94° C.

After reaching this temperature, there is a simultaneous addition of an acidulating agent and an alkali metal silicate. During this simultaneous addition, the rate of acid addition was adjusted to maintain the pH within the range of 7.4–7.6, while the silicate addition rate was maintained constant. The silicate addition is discontinued after about 0 minutes to about 60 minutes, such as about 30 minutes, but the acid addition continues until the reaction mixture reaches a pH of between 4.5 to 6.5, such as about 5.8 to 6.2, such as about 6.0. The reaction mixtures then digests for about 0 minutes to about 60 minutes, after which the pH is readjusted to a range of between 4.5 to 6.5, such as about 5.8 to 6.2, such as about 6.0.

After the completion of digestion, the reaction batch is filtered and washed with water to remove excess inorganic salts until the wash water from the composite pigment filter cake obtains a conductivity of less than about $3000\mu$ siemens. Because the conductivity of the composite pigment filtrate is proportional to the inorganic salt by-product concentration in the filter cake, by maintaining the conductivity of the filtrate to be less than $3000\mu$ siemens it can be ensured that the concentration of inorganic salts, such as $Na_2SO_4$, in the filter cake is not above 2.0 wt %.

The composite pigment filter cake is slurried in water, and then dried by any conventional drying techniques, such as spray drying, to produce a composite material containing from about 3 wt % to about 15 wt % of moisture. The composite material may then, optionally, be milled to obtain the desired particle size.

The composite pigment material can then, if desired, be placed in a low dust/readily dispersible form by any forming process such as granulation, pelletization, and/or other known forming means. A granulation process is preferred where the composite pigment material is compressed into compacted bodies, the bodies then being broken into smaller particles. The fine fraction of the smaller particles is then recovered and mixed with more composite material, and that mixture is compressed into denser compacted bodies. The denser compacted bodies are then broken-up and screened to the desired size to form the granulated product. A vacuum may be applied during various points in the process to aid in the densification. Spray dried composite material can be milled prior to granulation. These forming procedures can be accomplished with or without the aid of other product forming agents.

The composite pigment filler material prepared according to present invention as described above comprises about 5 wt % to about 70 wt % silica, and about 30 wt % to about 95 wt % inorganic material, preferably about 30 wt % to about 50 wt % silica, and about 50 wt % to about 70 wt % inorganic material. The CTAB surface area of the composite pigment is greater than about 20 $m^2/g$, and the BET surface area of the composite pigment will be greater than about 25 $m^2/g$, such as about 100% to about 120% the CTAB surface area. The oil absorption of the composite pigment is about 30 cc/100 g to about 150 cc/100 g. The composite pigment has a density of about 2.5 $g/cm^3$ to about 4.9 $g/cm^3$.

The inorganic material used in the present invention may be selected from several different species of inorganic material. Preferred inorganic materials include water-insoluble metals, metal oxides, sulfides and sulfates with a density greater than 2.5 $g/cm^3$, such as zinc metal (dust form), barium sulfate, zinc sulfate, zinc oxide, and tungsten oxide, zinc sulfide, and copper sulfide.

In addition to the rubber elastomer and the composite pigment filler, Rubber Compositions of the present invention may also include other fillers, as well as additional chemical additives such as processing aids, coupling agents, vulcanization agents and activators, and antidegradants.

Processing aids include those materials used to modify rubber during the mixing or processing steps. These include rheology modifiers that may be added to soften or decrease the viscosity of the rubber to make it easier to process during manufacture. Suitable processing aids include aromatic, naphthenic, and parafinnic process oils, plasticizers, low temperature plasticizers, homogenizers, internal lubricants such as zinc soaps.

Vulcanization agents and accelerators may also be added. Vulcanization agents provide chemical crosslinks between the adjacent long chains of rubber polymers to form a three-dimensional structure that is strong and elastic. Vulcanization accelerators reduce the curing time by increasing the rate of vulcanization. Increased curing rates also tends to produce polymers having superior physical properties since a greater degree of crosslinking is obtained. Along with vulcanization accelerators, accelerator activators may also be used. Suitable activators include zinc oxide (such as the KADOX® products, from Zinc Corporation of America) and stearic acid (such as the EMERY stearic acids, from Henkel). Accelerator activators are available the Akrochem Corporation, Akron, Ohio. Suitable vulcanization agents, activators and accelerators also include sulfur, peroxides, sulfur donors, accelerators (e.g., sulfenamide, sulfenimide, guanidine, thiuram), reversion inhibitors, hydrid cross-linking agents, and cure retarders.

Coupling agents may also be used in the present Rubber Compositions. Coupling agents provide strong, connective adhesion between the filler (in particular a non-carbon black filler, like silica) and the polymeric chains of the rubber in order to reinforce the strength of the rubber material. Suitable coupling agents include the Elast-O-Flux DiSS 60 products available from the Rhein Chemie Corporation, which use the silane bis(3-(triethoxysilyl)propyl)disulfide, ("TESPD") at 60% active ingredient; or X50S from the Struktol Corp., Stow, Ohio, which consists of 50% carbon black and 50% bis(triethoxysilylpropyl)tetrasulfide ("TESPT") silane, deposited on the carbon black Also suitable are silanes of sulfur, vinyl, mercapto, methacryloxy, amino, and epoxy functional alkoxysilanes and chloro silanes.

Antidegradants may also be included in the Rubber Compositions prepared according to the present invention. Antidegradants, the most common of which are the antioxidants, function by slowing the deterioration and aging of vulcanized rubber products. Suitable antiozonants are sold under the SANTOFLEX name and are available from Flexsys, L.L.P., Akron, Ohio. Also suitable are mechanical function antiozonants, such as petroleum waxes. Especially preferred are the microcrystalline paraffinic wax sold under the name SUNOLITE, also available from Crompton Knowles.

In addition to the composite pigment filler, Rubber Compositions of the present invention may also include other fillers, such as carbon black. Suitable carbon black material includes the N343 and Vulcan K/N351 carbon blacks available from the Cabot Corporation, Billerica, Mass. Other suitable fillers include precipitated silica, fumed silica, clay, talc, titanium dioxide, zinc sulfate, aluminum trihydrate, sodium silicate, sodium magnesium aluminosilicate, barium sulfate, calcium carbonate, starch, mica, gypsum, feldspar, wollastonite, carbon black—silica hybrids, carbon black—metallic hybrids, and other fillers known to those of ordinary skill in the art.

The Rubber Compositions disclosed herein may also a variety of additional ingredients such as homogenizing agents, odorants, dusting agents, retarders, colorants, blowing aids, abrasives, and other Rubber Composition adjuvants known to a person of ordinary skill in the art.

All of these various components are mixed together and combined in an industrial or laboratory scale mixer to form the Rubber Composition. Any mixer capable of thoroughly homogenizing the aforementioned rubber components is acceptable. On an industrial scale, suitable mixers include Banbury® or Shaw® mixers.

Mixing may occur either in a sequential or parallel-sequential order of steps; each of the steps, in which ingredients are added and mixed together, will be referred to herein as a "mixing stage". In the first mixing stage, mixing stage 1, the ingredients that are mixed together include most of the rubber elastomer in the Rubber Composition, as well as some of the fillers that are to be added to the composition, along with other ingredients. The mixing will be controlled so that these ingredients and the Rubber Composition are appropriately mixed as additional ingredients are added to the mixture. The specific point at which the additional ingredients are added may be determined by the elapsed mixing time or by the specific temperature of the mixture. The completion of the mixing stage is also determined by elapsed time or mixing or by a specific temperature setpoint. After completion of mixing, the mixing of the particular stage will be completed and dropped out of the mixer.

In a sequential mixing process, the batch produced in the first mixing stage is added to the next (second) mixing stage. When the second mixing stage is complete the batch from that mixing stage is then dropped out of the mixer and added to a third mixing stage and so on until mixing is completed.

An alternative mixing process to the aforementioned sequential process, is a parallel-sequential mixing process (examples of the parallel-sequential process are given below in manufacturing Rubber Compositions 21, 24, and 25). In the parallel-sequential process during the first mixing stage, two separate batches are prepared. One of the batches is processed in the conventional sequential mixing process described above, while the other batch referred to herein as a "masterbatch" is added during a later mixing stage of the conventional sequential mixing process. In the preparation of Rubber Compositions 21, 24, and 25, below, the masterbatches are added to the second mixing stage.

Several properties of the Rubber Compositions set forth above were then measured using dynamic mechanical analysis ("DMA") and the values obtained from the measurements set forth below. These tests were carried out to assess how the Rubber Composition would perform when formed into one of the components of a tire. Dynamic mechanical analysis attempts to analyze the performance of the Rubber Composition as it would perform under actual service conditions, where deformation and stress occur dynamically as the tire makes contact with the road.

In the present case, DMA was conducted by fixing a sample to analytical DMA testing device at two separate locations on the sample. At one sample location, deformation on the sample will be imposed, while the other sample location is fixed to a load cell that measures the force that is transmitted through the sample. The temperature is generally controlled by an environmental chamber since the properties measured by DMA are also a function of temperature. The deformation is imposed as a cyclic sinusoidal waveform and the resultant force is measured. The resultant force is treated as a cyclic sinusoidal waveform that has been shifted in phase by an angle $\delta$. This phase shift $\delta$ is a result of the mechanical energy loss that occurred within the sample.

There are two common protocols for evaluating the dynamic mechanical properties of a material. One, typically called a "temperature sweep" measures properties as a function of temperature. The other protocol, typically called a "strain sweep" characterizes DMA properties as a function of strain.

DMA testing begins by preparing a thin elastomer sample (typically measuring approximately ⅛ inch thick, ½ inch wide, and 2 inches long) and clamping the sample securely inside an environmental chamber. In the "temperature sweep" protocol, the test starts at a high temperature (for example 60° C.) and then cooled to a low temperature point (in the neighborhood of −80° C.). The frequency at which test is conducted is held constant. A small deformation is then applied, and the resulting force is measured. After the deformation is completed, the temperature is decreased by a temperature interval (the interval typically being between 1° C. to 10° C.) the deformation is repeated, and additional force measurements made. The process is completed until the low temperature setting is achieved. Alternatively, the process may also be done in the opposite direction, with the sample starting at a relatively low temperature, and the temperature in the environmental chamber increased by an interval of 1° C. to 10° C. between each deformation.

In the strain sweep protocol, the temperature and frequency are held constant. The test starts at a lower strain, such as 0.25% double strain amplitude and then is increased to a higher strain, such as 7% double strain amplitude. In the test, the strain is increased at 0.25% increments, measurements are made after 3 cycles at each strain setting, and there is no time delay between strain measurements. The test can be repeated at different temperatures to obtain different DMA properties and characteristics, which is discussed in greater detail below.

Using these testing techniques, the storage modulus and loss modulus of an elastomer material can be determined, and from the storage modulus and loss modulus, the tan can computed. The maximum tan measured with respect to temperature is considered to be the glass transition temperature ("$T_g$"). The glass transition temperature is one of the most important characteristics of a rubber or elastomeric formulation. As the temperature increases above the $T_g$, the rubber formulation increases in elasticity and resilience. While at temperatures decreasing below the $T_g$ the rubber hardens, becoming brittle and losing it's elasticity. The tan curve of the elastomer (which provides one accurate estimate of the $T_g$) can itself be related to several relevant tire performance properties when the elastomer composition is used to manufacture tire components. The tan measured at 60° C. is a measure of the rolling resistance. A lower tan value at 60° C. is indicative of lower rolling resistance. Similarly, the tan measured at 0° C. is a measure of the skid resistance (i.e., traction on wet surfaces). A higher tan value at 0° C. is indicative of better wet traction performance. The tan measured at $T_g$ also reflects the wet traction performance of the elastomer composition. The tan at 0° C. and the tan at 60° C. are obtained using strain sweep DMA testing, while the tan at $T_g$ is obtained by using temperature sweep DMA testing.

The relevance of these properties and characteristics depends on the specific service conditions of a tire that are being compared. If one were making a comparison of wet traction on concrete, which has a very smooth surface and therefore a low coefficient of friction, tan at $T_g$ would be more relevant than the tan at 0° C. However, on a rougher wetted surface, such as newly paved asphalt the tan at 0° C. would be a more relevant predictor of performance. Thus, the differences in the wet traction performance is due to the effect of the road surface roughness on the frequency of deformation imposed upon the rubber as it is sliding across the wetted surface. Generally, a tire should be designed so that its best performance comes under the most adverse circumstances so it is more important to design a tire so that its wet traction performance is best under the most adverse circumstances (in this case the most adverse circumstances would be where the coefficient of friction is lowest), and so it is more important to evaluate the wet traction performance by using the tan at $T_g$. To further illustrate how the tan at $T_g$ varies with Rubber Compositions, in FIG. 1 is shown a graph of Tan versus temperature for several different Rubber Compositions (the specific compositions are set forth below in Table XII.). The $T_g$ is the temperature that corresponds to the maximum value of tan, approximately −37° C. As can be seen in FIG. 1 (and which will be shown as well in the examples below) from the Tan δ at the $T_g$ (−37° C.), the wet traction performance of Rubber Compositions made with the present composite materials as filler is superior to the wet traction performance of Rubber Compositions using HDS silica or carbon black.

It is important to note that the measured value of $T_g$ is influenced by the loading rate (i.e., frequency) at which the DMA is performed. This is because the $T_g$ is due to the molecular dynamics of the polymer molecules, and the frequency will have an effect on the molecular dynamics.

Specific DMA testing parameters and procedures are discussed below, in greater detail, with regard to the examples.

The invention will now be described in more detail with respect to the following, specific, non-limiting examples.

EXAMPLES 1–7

In Examples 1–7, composite pigments for use in styrene-butadiene Rubber Compositions (and other rubber and elastomer applications) as according to the present invention were prepared. The quantities and concentration of reactants and the reactant conditions for preparing the composite pigments are set forth in Table I, below.

First an aqueous solution of 1.5 wt % $Na_2SO_4$ was added to an aqueous solution of sodium silicate $Na_2O:SiO_2$ (3.3 molar ratio $Na_2O:SiO_2$) in a reactor equipped with a mechanical stirrer and a heating device (preferably steam heated). Thereafter the reactor contents was heated to an initial temperature with constant stirring at 400 rpm after which a specified amount of a dense inorganic core material was added to the reactor.

Stirring was continued for another 5 minutes to disperse the dense inorganic core material. Thereafter, a solution of $H_2SO_4$ was then added at a specified rate until pH 7.5 was reached. If a recirculation loop was used, the loop was opened and the pump turned on at a specified time measured from the beginning of acid addition. The stirring rate was then reduced to 300 rpm. When the pH reached 8.8, the reaction temperature was ramped to the second reaction temperature. In the case where no recirculation was used, the acid addition was stopped when the pH reached 7.5 and the temperature then increased to a second reaction temperature. In both cases, there was a co-addition of sulfuric acid and sodium silicate at specified rates after the reaction mixture reached the second reaction temperature. The rate of acid addition was adjusted in order to maintain the pH within the range of 7.4–7.6; the silicate addition rate was maintained constant. The silicate addition was terminated after 30 minutes, while the acid addition continued thereafter at a final acid rate until a pH of 6.0 was reached. The reaction mixture was allowed to digest for 10 minutes at the second reaction temperature with stirring, after which the pH was readjusted to 6.0. The slurry was filtered using a rotary vacuum filter or a plate and frame filter and washed to conductivity of less than 3000μ siemens or less than 2.0 wt % sodium sulfate. Thereafter the product was oven dried or spray dried at 10% solids to obtain a final composite pigment material that contained a silica coating and a dense inorganic core.

The quantities of the reactants added and the reactant conditions are as follows:

TABLE I

|  | Example 1 | Example 2 | Example 3 | Example 4 | Example 5 | Example 6 | Example 7 |
|---|---|---|---|---|---|---|---|
| Initial volume 1.5 wt % $Na_2SO_4$ soln., L | 9.60 | 9.6 | 9.6 | 9.6 | 16 | 16 | 385.2 |
| Sodium silicate conc., wt. % | 24.7% | 24.7% | 24.7% | 24.7% | 24.7% | 24.7% | 24.7% |
| Initial vol. Sodium silicate soln., L | 6.0 | 6.0 | 6.0 | 6.0 | 10 | 10 | 240 |
| Initial reaction temperature, °C. | 74 | 84 | 84 | 79 | 84 | 84 | 71 |
| Inorganic core material | $BaSO_4$ | $BaSO_4$ | $BaSO_4$ | $BaSO_4$ | $BaSO_4$ | $BaSO_4$ | $BaSO_4$ |
| Wt. Inorganic core, kg | 1.66 | 1.66 | 9.4 | 3.46 | 6.47 | 15.7 | 138.4 |
| $H_2SO_4$ conc., wt. % | 11.4% | 11.4% | 11.4% | 11.4% | 11.4% | 11.4% | 11.4% |
| $H_2SO_4$ addition rate, L/min | 0.374 | 0.174 | 0.174 | 0.274 | 0.290 | 0.290 | 16.56 |
| Recirculation pump started, min. | 8.0 | 15 | 15 | 12 | 0 | 0 | 12 |
| Second reaction temp., °C. | 93 | 93 | 93 | 93 | 93 | 93 | 93 |
| Acid co-addition rate, ml/min | 33–45 | 33–45 | 33–45 | 33–45 | 55 | 55 | 1500–1800 |
| Silicate co-addition rate, ml/min | 40.2 | 40.2 | 40.2 | 40.2 | 67 | 67 | 1608 |
| Final acid addition rate, ml/min | 33 | 33 | 33 | 33 | 50 | 50 | 1320 |

EXAMPLE 8

Example 8 is a composite pigment, specifically a "dense phase silica" coated barium sulfate, that was prepared under somewhat different processing conditions than the composite pigments of examples 1–7, above. In this example, the silica coating is formed as a thin coating layer around the surface of barium sulfate particles. Because the coating layer is in this thin, adhering form, the overall silica/barium sulfate particle still has the same recognizable shape as that of the barium sulfate core, before the silica application. These dense phase silica coated inorganic particles have a relatively low surface area.

In this specific example the dense phase silica coated barium sulfate core was prepared by first mixing 58.5 L of water with 6.5 kg of barium sulfate (Huberbrite 1, in a 10% slurry) in an atmospheric reactor equipped with a mechanical stirrer and a heating device. The reactor was subsequently heated to 90° C. with stirring at 400 rpm. Then a solution of 11.4 wt % sulfuric acid and a solution of 13.3 wt % sodium silicate (3.3 molar ratio) were simultaneously added to the reactor at rates of 104 ml/min and 338 ml/min, respectively. During the addition of the sulfuric acid and sodium silicate, the pH was maintained at 9.0±0.2 by slightly adjusting the rate of acid addition (and keeping the rate of silicate addition constant). The silicate addition was terminated after 30 minutes while the acid addition continued until the pH was 5.5±0.1. The resulting product was filtered immediately and washed to a conductivity of less than 3000 siemens or less than 2.0 wt % sodium sulfate. Thereafter the final product was reslurried to 10% solids and spray dried to obtain a prior art filler material that contained 15 wt % dense-phase silica and 85 wt % barium sulfate.

The CTAB surface area, BET surface area, oil absorption, density, and particle size of the Composite Pigment filler material prepared in Examples 1–8, and the values obtained from the measurements set forth below in Table II. The measurement methods are as follows.

The oil absorption properties shown in Table II (and throughout this application) were measured with the rubout method. In this test, oil is mixed with the composite material and rubbed with a spatula on a smooth surface until a stiff putty-like paste is formed. By measuring the quantity of oil required to have a paste mixture, which will curl when spread out, one can calculate the oil absorption value of the metasilicate, the value which represents the volume of oil required per unit weight of the composite material to completely saturate the metasilicate absorptive capacity. Calculation of the oil absorption value was done according to equation (I):

$$\text{Oil absorption} = \frac{\text{ml oil absorbed}}{\text{weight of composite, grams}} \times 100 \qquad (I)$$

$$= \text{ml oil}/100 \text{ gram composite}$$

Particle size is determined using a Model LA-910 laser light scattering instrument available from Horiba Instruments, Boothwyn, Pa. A laser beam is projected through a transparent cell which contains a stream of moving particles suspended in a liquid. Light rays which strike the particles are scattered through angles which are inversely proportional to their sizes. The photodetector array measures the quantity of light at several predetermined angles. Electrical signals proportional to the measured light flux values are then processed by a microcomputer system to form a multi-channel histogram of the particle size distribution.

CTAB external surface area of composite material is determined by absorption of CTAB (cetyltrimethylammonium bromide) on the pigment or composite surface, the excess separated by centrifugation and determined by titration with sodium lauryl sulfate using a surfactant electrode. The external surface of the composite material is determined from the quantity of CTAB adsorbed (analysis of CTAB before and after adsorption). Specifically, about 0.5 g of composite material is placed in a 250-ml beaker with 100.00 ml CTAB solution (5.5 g/L), mixed on an electric stir plate for 1 hour, then centrifuged for 30 minutes at 10,000 rpm. One ml of 10% Triton X-100 is added to 5 ml of the clear supernatant in a 100-ml beaker. The pH is adjusted to 3.0–3.5 with 0.1 N HCl and the specimen is titrated with 0.0100 M sodium lauryl sulfate using a surfactant electrode (Brinkmann SUR1501-DL) to determine the endpoint.

The Gemini 2375 Surface Area Analyzer (from Micromeritics Corporation is used to determine the BET surface area of solid materials. It uses a technique in which the analysis gas (nitrogen) is metered simultaneously into a tube containing the sample and into a blank balance tube. The internal volume and the temperature surrounding both tubes are maintained at identical conditions, with the only difference being the presence of sample in the sample tube. The sample and balance tubes are immersed in a single liquid nitrogen bath, which maintains isothermal conditions for both tubes. Metering of the analysis gas is delivered to both the balance and sample tubes through separate servo valves. A differential pressure transducer measures the pressure imbalance between both tubes, which is caused by the adsorption of the gas onto the sample. As the sample adsorbs analysis gas, the servo valve maintains the pressure balance between the two tubes by admitting more gas into the sample tube. The end result is that the Gemini maintains a constant pressure of the analysis gas over the sample while varying the rate of analysis gas delivery to match the rate at which the sample can adsorb the gas. The rate at which the sample absorbs the gas can be correlated to the surface area of the sample.

In the present experiments, the BET was measured as follows. A 0.34 to 0.36 g sample was predried for 2 hours at 105° C. and degassed for 1 hour at 160° C. Micromeritics Flow Prep 060 nitrogen degassing unit was utilized, using the vacuum prep method described in the instrument manual. The evacuation rate is 300 mm Hg/min for 1 minute. The analysis mode used is an "equilibrate" with a 5-second equilibration time. Free space is measured employing helium as the free space gas. Five (5) points are measured between 0.05 and 0.20 P/Po.

The density of the composite material is calculated from the weight percent of silica at density 2.2 g/ml and the weight percent barium sulfate at density of 4.5 g/ml. For example, the density of a composite of 50% silica and 50% barium sulfate is (0.5×2.2)+(0.5×4.5)=3.35 g/ml. The results of these measurements and tests are given below in Table II (for composite pigment materials prepared according to the present invention.

The styrene-butadiene Rubber Compositions 1 and 2 were prepared from the ingredients set forth in Table III, below, using the following procedure.

Rubber Compositions 1–2, were prepared as follows. A 485 pound batch size of first mixture was prepared as follows. The compositions and ingredients for Rubber Compositions 1 and 2 are set forth below in Table III.

TABLE III

|  | Rubber Composition 1 | Rubber Composition 2 |
| --- | --- | --- |
| Mixing Stage 1 |  |  |
| SBR SL574 | 56.25 | 56.25 |
| Taktene BR 1203 | 18.75 | 18.75 |
| ESBR 1500 | 25.00 | 25.00 |
| Zeopol ® 8755 Silica | 40.00 | 0.00 |
| N343 Carbon Black | 0.00 | 15.00 |
| N351 Carbon Black | 0.00 | 20.75 |
| X50S (50% TESPT) Silane | 6.50 | 0.00 |
| Huberbrite ® Interlok Barium Sulfate | 0.00 | 4.77 |
| Aromatic Oil | 19.25 | 14.25 |
| Mixing Stage 2 |  |  |
| Zeopol ® 8755 Silica | 40.00 | 0.00 |
| N343 Carbon Black | 0.00 | 15.00 |
| N351 Carbon Black | 0.00 | 20.75 |
| Huberbrite Interlok Barium Sulfate | 0.00 | 4.77 |
| x50S 50% TESPT Silane | 6.50 | 0.00 |
| Aromatic Oil | 19.25 | 14.25 |
| Zinc Oxide | 2.50 | 2.50 |
| Stearic Acid | 1.00 | 1.00 |
| Sunolite 240TG Wax | 1.40 | 1.40 |
| Santoflex 13 Antiozonant | 2.00 | 2.00 |
| Mixing Stage 3 |  |  |
| Sulfur | 1.35 | 1.75 |
| Accelerator CBS | 1.70 | 0.00 |
| Accelerator DPG | 1.50 | 0.00 |
| Santogard PVI | 0.00 | 0.10 |

TABLE II

Properties of Composite Pigment Materials Prepared According to the Present Invention

|  | Example 1 | Example 2 | Example 3 | Example 4 | Example 5 | Example 6 | Example 7 | Example 8 |
| --- | --- | --- | --- | --- | --- | --- | --- | --- |
| Dense inorganic core | BaSO$_4$ | BaSO$_4$ | BaSO$_4$ | BaSO$_4$ | BaSO$_4$ | BaSO$_4$ | BaSO$_4$ | BaSO$_4$ |
| Silica, Wt % | 50 | 50 | 15 | 32.5 | 30 | 15 | 34.4 | 15 |
| CTAB, m2/g | 111 | 63 | 22 | 52 | 38 | 14 | 72 | 4 |
| BET, m2/g | 106 | 60 | 11 | 48 | 43 | 19 | 78 | 6 |
| Oil absorption, ml/100 g | 137 | 121 | 35 | 91 | 71 | 47 | 77 | 39 |
| Median particle size, μm | 19.2 | 9.9 | 4.5 | 10.7 | 4.8 | 2.8 | 86 | 3.4 |
| Density, g/ml | 3.35 | 3.35 | 4.15 | 3.75 | 3.81 | 4.15 | 3.708 | 4.14 |
| 5% pH | 8.0 | 8.1 | 8.5 | 7.8 | 7.9 | 8.1 | 8.2 | — |

To demonstrate their efficacy in Rubber Compositions for use in the tire industry, the composite pigments prepared in Examples 1–8 were incorporated into several different styrene-butadiene Rubber Compositions that are set forth in Tables III, and V–XI, below. The components listed in Tables III, and V–XI are described in greater detail in Table IV. The total filler systems used in the rubber compositions were of equal volume fraction within groupings: Rubber Compositions 1–2, Rubber Compositions 3–5, Rubber Compositions 6–7, Rubber Compositions 8–11, Rubber Compositions 12–17, Rubber Compositions 18–19, Rubber Compositions 20–21 and Rubber Compositions 23–25.

TABLE III-continued

|  | Rubber Composition 1 | Rubber Composition 2 |
| --- | --- | --- |
| TBBS | 0.00 | 2.20 |
| Total: | 242.95 | 220.49 |

Composition is listed by parts per 100 parts of rubber, by weight.

TABLE IV

Components of Rubber Compositions

| Ingredient | Chemical identity | Manufacturer |
|---|---|---|
| ESBR 1500 | Emulsion styrene-butadiene rubber | Ameripol Synpol |
| SSBR SL574 | Solution styrene-butadiene rubber | JSR, America |
| Taktene BR 1203 | Polybutadiene rubber | Bayer |
| Zeopol 8755 Silica | Precipitated amorphous silica | J.M. Huber Corporation |
| N343 | Carbon black | Cabot Corporation |
| N351 | Carbon black | Cabot Corporation |
| N330 | Carbon black | Cabot Corporation |
| Huberbrite Interlock | Polymer treated barium sulfate | J.M. Huber Corporation |
| Elast-O-Flux DiSS 60 | 60% Bis-[3-(triethoxysilyl)propyl]-disulfide silane | Rhein Corporation |
| X50S | 50% TESPT silane dispersion on carbon black | Struktol Corp. |
| Sundex 8125 | Aromatic Oil | R. E. Carroll |
| Kadox 911 | Zinc Oxide | Zinc Corporation of America |
| Emery 400 | Stearic acid | Henkel Corporation |
| Sunolite 240TG Wax | microcrystalline paraffinic wax | Crompton-Knowles Corp. |
| Santoflex 13 | Antioxidant | Flexsys L.L.P. |
| Accelerator CBS | N-cyclohexyl-2-benzothiazyl-sulfenamide | Akrochem Corp. |
| Accelerator DPG | N,N Diphenyl-guanidine | Akrochem Corp. |
| Santogard PVI | N-cyclohexylthio)phthalimide | Flexsys L.L.P. |
| TBBS | N-t-butyl-2-benzothiazyl-sulfenamide | Akrochem Corp. |

In mixing stage 1, 485-pound batch size was prepared. The elastomer components (SSBR SL574, ESBR 1500, and Taktene BR 1203) were added to a manually operated factory #11 Banbury® mixer equipped with 2 wing motors and masticated for 60 seconds at a rotor speed of 81 RPM. The specified fillers and silane (for Rubber Composition 1 only) were then added and mixing continued to a temperature of about 120° C. (250° F.), at which point the aromatic oil was added.

At this point, specifically for Rubber Composition 1, the mixing at 81 RPM continued until the batch reached a temperature of about 145° C. (295° F.) and then the RPM of the wing rotors was adjusted to run between 15 to 30 RPM so as to maintain the batch a temperature of about 150° C.±2° C. (300° F.±5° F.) for ninety seconds. After the ninety seconds has elapsed, the rotor speed was increased back to 81 RPM, and mixing continued at that speed until the batch temperature reached 152° C. (305° F.) at which point the first mixture batch was dropped from the mixer.

At this point, specifically for Rubber Composition 2, after the addition of the aromatic oil, mixing continued at a speed of 81 RPM until a temperature of 160° C. (320° F.) was reached. The batch of the first mixture was then dropped from the mixer.

In the second mixing stage, the batch size was 485 lbs. For both Rubber Compositions 1 and 2 the batch from the first mixing stage was mixed at 50 RPM for 30 seconds. All of the mixing stage 2 ingredients set forth above in Table III, were added EXCEPT the aromatic oil. Mixing then continued until the batch reached a temperature of 120° C. (250° F.), at which point the aromatic oil was finally added.

At this point for Rubber Composition 1 in the second mixing stage, the mixing continued until the second stage batch reached a temperature of 127° C. (260° F.), at which point the rotor speed was lowered to 40 RPM. Mixing continued until the batch reached a temperature of about 145° C. (295° F.) and then the RPM of the wing rotors was adjusted to run between 15 to 30 RPM so as to maintain the batch a temperature of about 150° C.±2° C. (300° F.±5° F.) for sixty seconds. After the sixty seconds has elapsed, the rotor speed was increased back to 81 RPM, and mixing continued at that speed until the batch temperature reached 152° C. (305° F.) at which point the batch of Rubber Composition 1 from the second mixing stage was then dropped from the mixer.

For Rubber Composition 2 in the second mixing stage, mixing continued at a speed of 81 RPM until a temperature of 160° C. (320° F.) was reached. The batch of Rubber Composition 2 from the second mixing stage was then dropped from the mixer.

In the third (final) mixing stage, the batch size was again 485 lbs. For both Composition 1 and Composition 2, the batch from mixing stage 2 was mixed at 25 RPM for thirty seconds. The ingredients set forth above in Table III were than added and mixing continued until a temperature of 105° C. (220° F.) was reached.

For Rubber Compositions 3–19, manufacture was program controlled and occurred in a Banbury BR1600 mixer with 2 wing rotors. Batches varied by weight but were all "sized" volumetrically based on a 70% fill factor. During mixing the ram was placed in the down position, and the ram was placed in the raised position while ingredients were being added. The compositions and ingredients for Rubber Compositions 3–19 are set forth below in Tables V, VI, VII and VIII.

TABLE V

| | Rubber Composition 3 | Rubber Composition 4 | Rubber Composition 5 |
|---|---|---|---|
| Mixing Stage 1 | | | |
| SSBR SL574 | 75.00 | 75.00 | 75.00 |
| Taktene BR 1203 | 25.00 | 25.00 | 25.00 |
| Stearic Acid | 1.00 | 1.00 | 1.00 |
| Sunolite 240TG Wax | 1.40 | 1.40 | 1.40 |
| Santoflex 13 Antiozonant | 0.50 | 0.50 | 0.50 |
| Mixing Stage 2 | | | |
| N234 Carbon Black | 30.00 | 30.00 | 30.00 |
| Zeopol 8715 Silica | 30.00 | 0.00 | 0.00 |
| Huberbrite ® 1 Barium Sulfate | 0.00 | 63.00 | 0.00 |
| Composite Example 8 (15 wt % silica) | 0.00 | 0.00 | 59.25 |
| Elast-O-Flux DiSS 60 (60% Active TESPD silane) | 2.50 | 2.50 | 2.50 |
| Sundex 8125 Oil | 16.00 | 16.00 | 16.00 |
| Santoflex 13 Antiozonant | 1.50 | 1.50 | 1.50 |
| Zinc Oxide | 2.50 | 2.50 | 2.50 |
| Mixing Stage 3 | | | |
| Sulfur | 1.80 | 1.80 | 1.80 |
| Accelerator CBS | 0.95 | 0.95 | 0.95 |
| Accelerator DPG | 0.50 | 0.50 | 0.50 |
| Total: | 188.65 | 221.65 | 217.90 |

Composition is listed by parts per 100 parts of rubber, by weight.

TABLE VI

|  | Rubber Composition 6 | Rubber Composition 7 |
|---|---|---|
| Mixing Stage 1 | | |
| SSBR SL 574 | 75.00 | 75.00 |
| Taktene BR 1203 | 25.00 | 25.00 |
| Stearic Acid | 1.00 | 1.00 |
| Sunolite 240TG Wax | 1.40 | 1.40 |
| Santoflex 13 Antiozonant | 0.50 | 0.50 |
| Mixing Stage 2 | | |
| Composite Example 5 (30% Silica) | 108.00 | 0.00 |
| Composite Example 6 (15% Silica) | 0.00 | 118.50 |
| Elast-O-Flux DiSS 60 (60% Active TESPD silane) | 5.00 | 5.00 |
| Sundex 8125 Oil | 16.00 | 16.00 |
| Santoflex 13 Antiozonant | 1.50 | 1.50 |
| Zinc Oxide | 2.50 | 2.50 |
| Mixing Stage 3 | | |
| Sulfur | 1.80 | 1.80 |
| Accelerator CBS | 0.95 | 0.95 |
| Accelerator DPG | 0.50 | 0.50 |
| Total: | 239.15 | 249.65 |

Composition is listed by parts per 100 parts of rubber, by weight.

TABLE VII

|  | Rubber Composition 8 | Rubber Composition 9 | Rubber Composition 10 | Rubber Composition 11 |
|---|---|---|---|---|
| Mixing Stage 1 | | | | |
| SSBR SL 574 | 75.00 | 75.00 | 75.00 | 75.00 |
| Taktene BR 1203 | 25.00 | 25.00 | 25.00 | 25.00 |
| N330 CB | 3.00 | 3.00 | 3.00 | 3.00 |
| Sunolite 240TG Wax | 1.40 | 1.40 | 1.40 | 1.40 |
| Mixing Stage 2 | | | | |
| Huberbrite ® 1 Barium Sulfate | 76.01 | 0.00 | 0.00 | 0.00 |
| Huberbrite ® Interlok Barium Sulfate | 0.00 | 76.01 | 0.00 | 0.00 |
| Composite Example 3 | 0.00 | 0.00 | 70.00 | 0.00 |
| Composite Example 4 | 0.00 | 0.00 | 0.00 | 62.75 |
| Elast-O-Flux DiSS 60 (60% Active TESPD silane) | 8.33 | 8.33 | 8.33 | 8.33 |
| Sundex 8125 Oil | 8.00 | 8.00 | 8.00 | 8.00 |
| Santoflex 13 Antiozonant | 2.00 | 2.00 | 2.00 | 2.00 |
| Zinc Oxide | 2.50 | 2.50 | 2.50 | 2.50 |
| Stearic Acid | 1.00 | 1.00 | 1.00 | 1.00 |
| Mixing Stage 3 | | | | |
| Sulfur | 1.35 | 1.35 | 1.35 | 1.35 |
| Accelerator CBS | 1.70 | 1.70 | 1.70 | 1.70 |
| Accelerator DPG | 0.20 | 0.20 | 0.20 | 0.20 |
| Total: | 205.49 | 205.49 | 199.48 | 192.23 |

Composition is listed by parts per 100 parts of rubber, by weight.

TABLE VIII

| | \multicolumn{8}{c}{Rubber Composition Number:} |
|---|---|---|---|---|---|---|---|---|

|  | 12 | 13 | 14 | 15 | 16 | 17 | 18 | 19 |
|---|---|---|---|---|---|---|---|---|
| Mixing Stage 1 | | | | | | | | |
| SSBR SL 574 | 75.00 | 75.00 | 75.00 | 75.00 | 75.00 | 75.00 | 75.00 | 75.00 |
| Taktene BR 1203 | 25.00 | 25.00 | 25.00 | 25.00 | 25.00 | 25.00 | 25.00 | 25.00 |

TABLE VIII-continued

| | Rubber Composition Number: | | | | | | | |
|---|---|---|---|---|---|---|---|---|
| | 12 | 13 | 14 | 15 | 16 | 17 | 18 | 19 |
| N330 CB | 3.00 | 3.00 | 3.00 | 3.00 | 3.00 | 3.00 | 3.00 | 3.00 |
| Sunolite 240TG Wax | 1.40 | 1.40 | 1.40 | 1.40 | 1.40 | 1.40 | 1.40 | 1.40 |
| Mixing Stage 2 | | | | | | | | |
| DP-5016 Silica | 80.00 | 55.00 | 55.00 | 55.00 | 55.00 | 55.00 | 21.50 | 18.10 |
| Huberbrite ® 1 | 0.00 | 53.75 | 0.00 | 0.00 | 0.00 | 0.00 | 8.50 | 0.00 |
| Example Composite 3 (15% Silica) | 0.00 | 0.00 | 49.44 | 0.00 | 0.00 | 0.00 | 0.00 | 0.00 |
| Example Composite 4 (32.5% Silica) | 0.00 | 0.00 | 0.00 | 44.41 | 0.00 | 0.00 | 0.00 | 0.00 |
| Example Composite 2 (50% Silica) | 0.00 | 0.00 | 0.00 | 0.00 | 39.38 | 0.00 | 0.00 | 0.00 |
| Example Composite 1 (50% Silica) | 0.00 | 0.00 | 0.00 | 0.00 | 0.00 | 39.38 | 0.00 | 11.90 |
| N343 carbon black | 0.00 | 0.00 | 0.00 | 0.00 | 0.00 | 0.00 | 50.00 | 50.00 |
| Elast-O-Flux DiSS 60 (60% Active TESPD silane) | 10.67 | 10.67 | 10.67 | 10.67 | 10.67 | 10.67 | 10.67 | 10.67 |
| Sundex 8125 Oil | 32.50 | 32.50 | 32.50 | 32.50 | 32.50 | 32.50 | 32.50 | 32.50 |
| Santoflex 13 Antiozonant | 2.00 | 2.00 | 2.00 | 2.00 | 2.00 | 2.00 | 2.00 | 2.00 |
| Zinc Oxide | 2.50 | 2.50 | 2.50 | 2.50 | 2.50 | 2.50 | 2.50 | 2.50 |
| Stearic Acid | 1.00 | 1.00 | 1.00 | 1.00 | 1.00 | 1.00 | 1.00 | 1.00 |
| Mixing Stage 3 | | | | | | | | |
| Sulfur | 1.35 | 1.35 | 1.35 | 1.35 | 1.35 | 1.35 | 1.35 | 1.35 |
| Accelerator CBS | 1.70 | 1.70 | 1.70 | 1.70 | 1.70 | 1.70 | 1.70 | 1.70 |
| Accelerator DPG | 2.00 | 2.00 | 2.00 | 2.00 | 2.00 | 2.00 | 2.00 | 2.00 |
| Total: | 238.12 | 266.87 | 262.56 | 257.53 | 252.50 | 252.5 | 238.12 | 238.12 |

Composition is listed by parts per 100 parts of rubber, by weight.

For Rubber Compositions 3–19, in the first stage, SL-574 rubber was added to the Banbury mixer and masticated at 45 RPM for 1 minute. The BR-1203 rubber was then added and mixing continued for another one minute. The remaining ingredients listed in the above tables were then added and rotor speed increased to 77 RPM. When the batch temperature reached 130° C. (270° F.) or 4 minutes total time the rotor speed was increased to 120 RPM and mixing continued to 155° C. (310° F.) when the batch was dropped from the mixer.

The batch from the first stage was added to the Banbury mixer and mixed at a rotor speed of 90 RPM for thirty seconds, and all of the mixing stage 2 ingredients set forth above in Tables V, VI, VII and VIII, were added EXCEPT the aromatic oil. Mixing then continued until the batch reached a temperature of 127° C. (260° F.), at which point the aromatic oil was finally added. Rotor speed was increased to 120 RPM and continued until the temperature of the batch reached 140° C. (280° F.). Rotor speed was then reduced to a rotor speed of 90 RPM and continued until a temperature of 145° C. (290° F.) was reached. At this point, the RPM of the rotors was adjusted to run between 50 to 90 RPM so as to maintain a batch temperature of about 150° C.±2° C. (300° F.±5° F.) for ninety seconds. After the ninety seconds has elapsed, the rotor speed was increased back to 110 RPM, and mixing continued at that speed until the batch temperature reached 175° C. (345° F.) at which point the batch from the second mixing stage was then dropped from the mixer.

In the third and final stage, the batch from the second stage was mixed at 50 RPM for thirty seconds. All ingredients were added after the initial thirty seconds. Mixing continued at 72 RPM until the temperature reached 100° C. (210° F.), at which point the batch was dropped from the mixer.

For Rubber Compositions 20–26, manufacture was program-controlled and occurred in a Banbury BR1600 mixer with 2 wing rotors. Batches varied by weight but were all "sized" volumetrically based on a 70% fill factor. During mixing the ram was placed in the down position, and the ram was placed in the raised position while ingredients were being added. Rubber Composition 20 and 23 were mixed according to the procedure given for Rubber Composition 3–19. Three of the above compositions, compositions 21, 24, and 25, were prepared in a sequential-parallel mixing processes. The parallel mixing stage is referred to herein as the "composite masterbatch" (in the tables below this is indicated as "MB"). The composite masterbatch is made separately to deliver the inventive material to the formulation more efficiently in a continuous production environment due to the longer mixing times associated with mixing stages containing silanes. The composite masterbatch has the same rubbers and other ingredients common to the comparative formulations, and these are added at concentrations sufficient to bring the concentrations of these ingredients comparable to the concentrations found in the comparative formulations, e.g. the rubber elastomer concentrations in Rubber Compositions 20 and 21 are identical, as are the carbon black filler and Sunolite 240TG wax levels. The compositions and ingredients for Rubber Compositions 20–26 are set forth below in Tables IX, X, XI.

TABLE IX

|  | Rubber Composition 20 | Rubber Composition 21 Composite MB 1 | Rubber Composition 22 |
|---|---|---|---|
| Mixing Stage 1 | | | |
| SSBR SL574 | 75.00 | 67.43 | 75.00 | 75.00 |
| Taktene BR 1203 | 25.00 | 22.50 | 25.00 | 25.00 |
| N330 CB | 3.00 | 2.70 | 3.00 | 3.00 |
| Sunolite 240TG Wax | 1.40 | 1.26 | 1.40 | 1.40 |
| Example Composite 7 | | | 100.00 | |
| Elast-O-Flux DiSS 60 (60% Active TESPD silane) | | | 8.33 | |
| Mixing Stage 2 | | | | |
| Zeopol ® 8755 Silica | 80.00 | | | |
| N343 carbon black | | 35.00 | | 40.00 |
| N351 carbon black | | 35.00 | | 40.00 |
| MB 1, which contains: | | | | |
| SSBR SL574 | | | 7.50 | |
| Taktene BR 1203 | | | 2.50 | |
| N330 CB | | | 0.30 | |
| Sunolite 240TG Wax | | | 0.14 | |
| Example Composite 7 | | | 10.00 | |
| Elast-O-Flux DiSS 60 (60% active TESPD silane) | | | 0.83 | |
| Elast-O-Flux DiSS 60 (60% active TESPD silane) | | 10.67 | 0.83 | |
| Sundex 8125 Oil | | 30.50 | 26.50 | 29.50 |
| Santoflex 13 Antiozonant | | 2.00 | 1.50 | 1.50 |
| Zinc Oxide | | 2.50 | 2.50 | 2.50 |
| Stearic Acid | | 1.00 | 1.00 | 1.00 |
| Mixing Stage 3 | | | | |
| Sulfur | | 1.35 | 1.75 | 1.75 |
| Activator CBS | | 1.70 | 1.35 | 1.35 |
| Activator DPG | | 2.00 | | 0.00 |
| Total: | | 236.12 | 219.76 | 212.73 | 222.00 |

Composition is listed by parts per 100 parts of rubber, by weight.

TABLE X

|  | Rubber Composition 23 | Rubber Composition 24 Composite MB 2 | |
|---|---|---|---|
| Mixing Stage 1 | | | |
| SSBR SL574 | 75.00 | 67.43 | 75.00 |
| Taktene BR 1203 | 25.00 | 22.50 | 25.00 |
| N330 CB | 3.00 | 2.70 | 3.00 |
| Sunolite 240TG Wax | 1.40 | 1.26 | 1.40 |
| Example Composite 7 | 0.00 | 0.00 | 100.00 |
| Elast-O-Flux DiSS 60 (60% Active TESPD silane) | | | 8.33 |
| Sundex 8125 Oil | | | 10.00 |
| Mixing Stage 2 | | | |
| Zeopol 8755 Silica | 80.00 | | |
| N343 CB | | 35.00 | |
| N351 CB | | 35.00 | |
| MB 2 | | | |
| SSBR SL574 | | 7.50 | |
| Taktene BR 1203 | | 2.50 | |
| N330 CB | | 0.30 | |
| Sunolite 240TG Wax | | 0.14 | |
| Composite Example 7 | | 10.00 | |
| Elast-O-Flux DiSS 60 (60% Active TESPD silane) | | 0.83 | |
| Sundex 8125 Oil | | 1.00 | |
| Elast-O-Flux DiSS 60 (60% Active TESPD silane) | 10.67 | | |
| Sundex 8125 Oil | 30.50 | 25.50 | |
| Santoflex 13 Antiozonant | 2.00 | 1.50 | |
| Zinc Oxide | 2.50 | 2.50 | |
| Stearic Acid | 1.00 | 1.00 | |
| Mixing Stage 3 | | | |
| Sulfur | 1.35 | 1.75 | |
| CBS | 1.70 | 1.35 | |
| DPG | 2.00 | | |
| Total: | 236.12 | 219.76 | 222.73 |

Composition is listed by parts per 100 parts of rubber, by weight.

TABLE XI

|  | Rubber Composition 25 MB 3 | | Rubber Composition 26 |
|---|---|---|---|
| Mixing Stage 1 | | | |
| SSBR SL574 | 66.07 | 75.00 | 75.00 |
| Taktene BR 1203 | 22.02 | 25.00 | 25.00 |
| N330 CB | 2.64 | 3.00 | 3.00 |
| Sunolite 240TG Wax | 1.23 | 1.40 | 1.40 |
| Composite Example 1 | | 100.00 | |
| Elast-O-Flux DiSS 60 (60% Active) | | 11.67 | |
| Sundex 8125 Oil | | 10.00 | |
| Mixing Stage 2 | | | |
| N343 CB | 34.06 | | 40.00 |
| N351 CB | 34.06 | | 40.00 |
| MB 3 | | | |
| SSBR SL574 | 7.50 | | |
| Taktene BR 1203 | 2.50 | | |
| N330 CB | 0.30 | | |
| Sunolite 240TG Wax | 0.14 | | |
| Composite Example 1 | 10.00 | | |
| Elast-O-Flux DiSS 60 (60% Active TESPD silane) | 1.17 | | |
| Sundex 8125 Oil | 1.00 | | |
| Sundex 8125 Oil | 27.00 | | 29.50 |
| Santoflex 13 Antiozonant | 1.50 | | 1.50 |
| Zinc Oxide | 2.50 | | 2.50 |
| Stearic Acid | 1.00 | | 1.00 |
| Mixing Stage 3 | | | |
| Sulfur | 1.75 | | 1.75 |
| CBS | 1.35 | | 1.35 |
| Total: | 222.08 | 226.07 | 222.00 |

Composition is listed by parts per 100 parts of rubber, by weight.

To form the composite masterbatch, rubber elastomers were added into the Banbury mixer and mixed for thirty seconds at 50 RPM. The composite filler, silane, and wax were added and the mixing speed increased to 90 RPM. When the temperature reached 127° C. (260° F.) the aromatic oil was added to the mix and the speed increased to 120 RPM, mixing then continued until a temperature of 137° C. (280° F.). The rotor speed was reduced to 100 RPM and mixing continued until a temperature of 145° C. (290° F.) was reached. The rotor speed was reduced to between 70 to 90 RPM to maintain batch temperature at 150° C.±2° C.(300° F.±5° F.) for ninety seconds. The rotor speed was increased to 120 RPM and mixing continued to 175° C. (345° F.).

In the first stage of manufacture of the compositions that were not processed using the composite masterbatch procedure mentioned above, the SL-574 rubber elastomer was first added to the mixer and masticated at 45 RPM for 1 minute. The BR-1203 rubber elastomer was added and mixing continued for another one minute. The remaining ingredients were added and the rotor speed was increased to 77 RPM. When the batch temperature reached 130° C. (270° F.) or 4 minutes total time the speed was increased to 120 RPM and mixing continued to 155° C. (310° F.) at which point the batch from the first mixing stage was then dropped from the mixer.

The batch from the first mixing stage (as well as the composite masterbatch in compositions 21, 24 and 25) was added and mixed for thirty seconds at a rotor speed of 50 RPM. One-half of the specified filler was added along with all of the silane and the rotor speed was increased to 90 RPM. One minute later the remaining filler material, one-half the aromatic oil, and the remaining ingredients (zinc oxide, stearic acid, antiozonant) were added. At 260° F. the remaining one-half aromatic oil was added to the mix and the rotor speed was then increased to 100 RPM and mixing continued until a temperature of 175° C. (345° F.), at which point the batch from the second mixing stage was dropped from the mixer.

For the third mixing stage, the batch from the second mixing stage was added and mixed at a speed of 50 RPM for thirty seconds. After thirty seconds elapsed, all additional ingredients were then added. Mixing continued at 72 RPM to 100° C. (210° F.) at which point manufacture was completed.

For Rubber Compositions 22 and 26, manufacture was program controlled and occurred in a Banbury BR1600 mixer with 2 wing rotors. Batches varied by weight but were all "sized" volumetrically based on a 70% fill factor. During mixing the ram was placed in the down position, and the ram was placed in the raised position while ingredients were being added.

In the first stage of manufacture the SL-574 rubber elastomer was first added to the mixer and masticated at 45 RPM for 1 minute. The BR-1203 rubber elastomer was added and mixing continued for another one minute. The remaining ingredients were added and the rotor speed was increased to 77 RPM. When the batch temperature reached 130° C. (270° F.) or 4 minutes total time the speed was increased to 120 RPM and mixing continued to 155° C. (310° F.) at which point the batch from the first mixing stage was then dropped from the mixer.

The batch from the first mixing stage was added and mixed for thirty seconds at a rotor speed of 50 RPM. One-half of the specified filler was added and the rotor speed was increased to 90 RPM. One minute later the remaining filler material, one-half the aromatic oil, and the remaining ingredients (zinc oxide, stearic acid, antiozonant) were added. At 260° F. the remaining one-half aromatic oil was added to the mix and the rotor speed was then increased to 100 RPM and mixing continued until a temperature of 140° C. (280° F.) was reached. Rotor speed was increased to 110 RPM and mixing continued until a temperature of 160° C. (320° F.), at which point the batch from the second mixing stage was dropped from the mixer.

The batch from the second mixing stage was added to the Banbury mixer and mixed at a speed of 50 RPM for thirty seconds. After thirty seconds elapsed, all additional ingredients were then added. Mixing continued at 72 RPM to 100° C. (210° F.) at which point manufacture was completed.

In addition to Rubber Compositions 1–26, four other Rubber Compositions were prepared and their Dynamic Mechanical properties then measured using DMA techniques. These Rubber Compositions are set forth below in Table XII. The Dynamic Mechanical properties obtained from the DMA tests for these Rubber Compositions are plotted graphically in FIG. 1, which illustrates the relationship between the value of Tan and temperature measured for the Rubber Compositions set forth in Table XII, below.

TABLE XII

Compositions of Rubber Samples shown in FIG. 1

| | N234 Carbon Black | Zeopol ® 8755 Silica | Composite Example 5 | Gum Rubber |
|---|---|---|---|---|
| Mixing Stage 1 | | | | |
| SSBR SL574 | 75.00 | 75.00 | 75.00 | 75.00 |
| Taktene BR 1203 | 25.00 | 25.00 | 25.00 | 25.00 |
| N330 CB | 3.00 | 3.00 | 3.00 | 3.00 |
| Sunolite 240TG Wax | 1.40 | 1.40 | 1.40 | 1.40 |
| Mixing Stage 2 | | | | |
| Zeopol ® 8755 Silica | 0.00 | 79.79 | 0.00 | 0.00 |
| CH-842-37 (32.5 SiO2) | 0.00 | 0.00 | 144.02 | 0.00 |
| N234 CB | 75.00 | 0.00 | 0.00 | 0.00 |
| Elast-O-Flux DiSS 60 | 3.75 | 14.39 | 7.35 | 0.00 |
| Aromatic Process Oil | 32.50 | 32.50 | 32.50 | 32.50 |
| Santoflex 13 Antiozonant | 2.00 | 2.00 | 2.00 | 2.00 |
| Zinc Oxide | 2.50 | 2.50 | 2.50 | 2.50 |
| Stearic Acid | 1.00 | 1.00 | 1.00 | 1.00 |
| Mixing Stage 3 | | | | |
| Sulfur | 1.35 | 1.35 | 1.35 | 1.35 |
| Delac S (CBS) | 1.70 | 1.70 | 1.70 | 1.70 |
| DPG | 0.00 | 1.60 | 0.80 | 0.00 |
| Total: | 224.20 | 241.23 | 297.62 | 145.45 |

Composition is listed by parts per 100 parts of rubber, by weight.

After Rubber Compositions 1–26 were prepared as above, several properties relating to the performance of the Rubber Compositions were measured as follows.

For Rubber Compositions 1–2 the rolling resistance was determined by a tire testing method in which the Rubber Compositions was prepared and manufactured by a tire manufacturing facility into P205/65R15H-Rated tires (the Rubber Compositions were made into the specific tread component of the aforementioned tires). The manufacturers tire test lab used a test method to determine the tire's rolling resistance. The results are indexed and a lower index means lower rolling resistance, which is desirable.

Additionally, a contract tire testing service also conducted wear testing over a driving distance of 12,000 miles. Four tires each having the same tread Rubber Composition were placed on the four wheel positions of a vehicle and driven for 1,000 miles at which time tread depth measurements were taken; the vehicle was driven for another 1,000 miles where tread depth measurements were again taken and then the tires were rotated between vehicles. This process was repeated every 1,000 miles for the length of the 12,000 mile test. Tread depth measurements taken to calculate the treadwear were taken at four points spaced radially across the tread at four different circumferential locations. The results reported in the table below are indexed tire wear results based on the final (cumulative wear) measurements averaged from the four tires, where a higher number is more desirable because it means more wear resistance.

Certain of the Rubber Compositions (those numbered 1–2, 20–26) were also tested using multi-segment retreaded tire wear testing. In this test, the Rubber Compositions were made into tread segments and retreaded onto tires. Retreading was accomplished by first obtaining new tires, and then buffing off the original treads with a retreader. Using a retreading adhesion compound, the retread was plied against the buffed carcass. The subject rubber compounds were prepared in two layers to fill the appropriate volume defined by the segment length, height, and width for the prescribed tire: P195/75R14 type. The tires were cured for 40 minutes at 280° F. Testing procedures for all of the Rubber Composition samples was the same except that for compositions 1–2, the segment was one-quarter of the circumference of the tread, while for compositions 20–26 the segments were one-sixth the circumference of the tread.

A contract tire testing service conducted the wear testing, using a common route in the southern United States of America over a driving distance of 10,000 miles. For the tires using retreads made from compositions 1–2, and 20–22, test conditions were as follows: 26 PSI front tire inflation, 28 PSI rear tire inflation, 75% rated tire loading (1,050 lbs.). For the tires using retreads made from compositions 23–26, test conditions were as follows: 32 PSI tire inflation all axles, 85% rated tire loading (1190 lbs.).

Wear results reported are an index of the average of miles traveled per millimeter abraded (miles per mil) for each section relative to the control compound, which was given an index of 100%. (Rubber Composition 1 served as a control for Rubber Composition 2. Rubber Composition 20 served as a control for Rubber Composition 21–22. Rubber Composition 23 served as a control for Rubber Composition 25–26.) The measurements for wear were taken off the center of the tread and the shoulders for both inboard and outboard sides of the tire; two sets of measurements were taken of each within the segment. The final wear index is reported in the tables, below.

The hardness properties of the Rubber Compositions were tested by first preparing the Rubber Composition in the form of a tensile properties sheet. This sheet was placed on a 65 Shore A hardness pad of rubber having a thickness of 0.080". A durometer, Type A (Shore Instruments), is applied by hand and five readings are taken of the maximum and the five readings averaged.

The Rubber Compositions were also evaluated in accordance with industry standards for: Mooney Viscosity (ASTM D1646), Rheometer: $M_L$, $M_H$, $t_s2$, t' 50, t'90 (ASTM D2084), Tension Properties: $T_{10}$, $T_{50}$, $T_{100}$, $T_{300}$, Tensile Strength, and Breaking Elongation (ASTM D412), Die C Tear and Molded Groove Tear (ASTM D624), and DIN Abrasion Resistance (ISO-4649).

DMA tests were made using a variety of different instruments. The first of these instruments was the Rubber Process Analyzer 2000, available from Alpha Technologies, Akron, Ohio. In this test, an uncured sample of rubber was placed into the RPA 2000 testing chamber and cured isothermally at 160° C. to T'90 (time to 90% cure) as determined using an Oscillating Disk Rheometer, also available from Alpha Technologies. It is immediately cooled by the system to 60° C. where the G* (complex modulus) and tan are measured. After that measurement is made the sample is further cooled by the system to 45° C. and a strain sweep is conducted to obtain the G* at 0.5% strain and 50% strain, and from this the calculation of the Payne Effect, G*(0.28%–50%), which gives an indication of the composite materials network reinforcement characteristics.

DMA testing was also made with an ARES Mechanical Tester, available from Rheometrics Scientific, Inc., Piscataway, N.J. This device was used for both temperature step and the strain sweep tests. The temperature step starts at 60° C. and proceeds down to –80° C., measuring points every 2° C. with a one minute soak time before each measurement point. The dynamic strain is set constant at 2% double strain amplitude and the frequency is maintained at 10 Hz. The temperature step can be used to measure tan at $T_g$ value.

As mentioned above, the tan at $T_g$ of a Rubber Composition is a good indicator of the wet traction performance of a tire tread made from the Rubber Composition. By using the tan at $T_g$ the prospective wet traction performance of a Rubber Composition can be compared with the wet traction performance of other Rubber Compositions. However, in order for this comparison to be valid, the $T_g$ for all of the Rubber Compositions must be the same or similar. In each of the individual tables, below, across which comparisons are made, the $T_g$ are similar to one another, and thus valid comparisons concerning prospective traction performance are capable of being made. However, for those Rubber Compositions whose $T_g$ are significantly different from each other, direct comparisons of their respective the tan at $T_g$ value may not result in a meaningful comparisons of the wet traction performance of tire treads made from such Rubber Compositions.

The Strain Sweep Mode Test produces the Tan and J" (loss compliance) data for the rubber compounds. The strain sweep starts at 0.25% double strain amplitude and continues until 7% double strain amplitude, at 0.25% double strain amplitude increments. This test is conducted at 60° C., 0° C., or at both temperatures. As mentioned above, the frequency is maintained at 5 Hz, measurements are after 3 cycles and there is no delay time between measurement points. Also, as mentioned above, a lower value for both are desired at 60° C. of the rubber compound to produce a lower rolling resistance for the tire. A higher value for both at 0° C. is desired of the rubber compound to produce a higher wet traction coefficient.

The DMA tests were conducted according to the Rheometrics testing specifications. Because the specific manner in which the sample preparation is carried out, and because the specific order of the temperature step and strain sweep tests can effect the test results, they will now be described in detail. A specimen is died out of the Tensile properties sheet to a length of 19 mm and a width of 12 mm perpendicular to the grain of the rubber, and the thickness is measured. The sample is placed in the lower torsional rectangular fixture, which is tightened to 34 in-oz, while the upper fixture is lowered into place at a gap opening of 18.78 mm and sample is set in it without tightening. The vertical force transducer reading is zeroed out and the autotension hold activated to track at zero vertical force with 3 g tolerance. The chamber is closed and sample is equilibrated to 60° C. at 5 minutes time.

The chamber is then opened and the sample is tightened to 34 in-oz in the upper fixture and chamber is closed again for five minutes at 60° to reconfirm sample temperature equilibration. The gap opening is recorded as the sample length and the previously measure width and thickness are also input as the sample dimensions. The upper fixture is then moved to impose a 5% tensile pre-strain on the sample.

Next, a frequency step test is run to condition the sample. This test is conducted at 60° C. and operates a 7% double strain amplitude displacement for 25 cycles at 1, 2, 5, and 10 Hz. After this conditioning, the sample is allowed to relax at 60° C. for 5 minutes.

After having been thusly prepared, the temperature step and strain sweep tests were executed. The tests were always conducted in the same sequence of testing after the conditioning. First is the Strain Sweep at 60° C.; then the Temperature Step test; then after bring the test chamber and sample to 0° C. and allowing 5 minutes for temperature equilibration, the strain sweep at 0° follows.

The results of all of the aforementioned tests are set forth in Tables XIII–XX, below.

TABLE XIII

| | Rubber Composition 1 | Rubber Composition 2 |
|---|---|---|
| Tire Rolling Resistance | | |
| Rolling Resistance Index | 100% | 99% |
| UTQG Tire Wet Traction Test | | |
| Asphalt Traction Index | 100% | 104% |
| Concrete Traction Index | 100% | 110% |
| Tire Wear Test | | |
| Wear Resistance Index @ 12,000 Miles | 100% | 88% |
| Multi-Segment Retreaded Tire Wear Testing | | |
| Wear Resistant Index @ 10,000 miles | 100% | 86% |
| Rubber Laboratory Testing | | |
| Rheometer @ 160° C., 3° arc, 30 min | | |
| $M_L$ (lbfin) | 7.9 | 7.0 |
| $M_H$ (lbfin) | 47.3 | 57.0 |
| $t_s2$ (min) | 3.3 | 5.2 |
| t' 50 (min) | 5.3 | 7.2 |
| t' 90 (min) | 8.5 | 8.5 |
| Mooney Viscosity | | |
| ML 1 + 4 @ 100° C. (MU) | 56 | 65 |
| Shore A Hardness | 72 | 75 |
| RPA | | |
| Tan Delta 60° C., 1% DSA, 1 Hz | 0.161 | 0.170 |
| G* 60° C., 1% DSA, 1 Hz (kPa) | 3337 | 5454 |
| $\Delta G^*(0.28\% \epsilon - 50\% \epsilon)$ 45° C., 1 Hz. (kPa) | 5528 | 8603 |
| DIN Abrasion: Cure: T90 + 5 mins. @ 160° C. | | |
| Abrasion Resistance Index | 137 | 119 |
| Ares Dynamic Mechanical Properties | | |
| Tan Delta @ Tg Ares Temp. Step 0.5% DSA | 0.802 | 0.826 |
| Tg (° C.) | -37 | -37 |
| Tan Delta 0° C. 0.5% DSA | 0.191 | 0.232 |
| Tan Delta 60° C. 0.5% DSA | 0.138 | 0.212 |
| Tensile: Cure: T90 + 5 mins. @ 160° C. | | |
| $T_{10}$ (MPa) | 0.8 | 1.0 |
| $T_{50}$ (MPa) | 1.4 | 2.1 |
| $T_{100}$ (MPa) | 2.3 | 4.0 |
| $T_{200}$ (MPa) | 4.8 | 9.8 |
| $T_{300}$ (MPa) | 8.9 | 15.5 |

TABLE XIII-continued

| | Rubber Composition 1 | Rubber Composition 2 |
|---|---|---|
| Tensile Strength (MPa) | 20.7 | 18.2 |
| Breaking Elongation (%) | 579 | 353 |
| Modulus Ratio | | |
| $T_{200}/T_{50}$ | 337% | 461% |
| $T_{300}/T_{100}$ | 388% | 385% |

In Table XIII, the performance of Rubber Composition 1, which contains Zeopol® 8755 silica filler, was compared to Rubber Composition 2, which contains Huberbrite® Interlok barium sulfate and commercially available carbon blacks. (Both of these are prior art compositions). Comparisons were made of the compositions' respective rheological and mechanical properties from laboratory testing (and in fact the rheological and mechanical properties are given for all of the sample Rubber Compositions). Also shown are the DMA properties (discussed in greater detail below) that correspond to wet traction (tan at $T_g$, tan at 0° C.) and the rolling resistance (tan at 60° C.). It can be seen in Table XIII, that the tan at $T_g$, tan at 0° C. are higher for Rubber Composition 2 over Rubber Composition 1, indicating that Rubber Composition 2 has better wet traction performance. However, by contrast, Rubber Composition 2 should have a higher rolling resistance as evidenced by the composition having a higher tan at 60° C. than Rubber Composition 1 from the ARES test machine while the RPA shows the tan at 60° C. to be similar like the rolling resistance of tires made with these composition as treated were found to be.

There is also data in Table XIII pertaining to the wear resistance of the Rubber Compositions. Tire wear resistance under actual service conditions is difficult to predict in the laboratory because of many complex interactions in the tire, which cannot be simulated in one laboratory test. However, rough estimates of the tire wear resistance can be obtained from the values of the Rubber Composition's abrasion resistance (referred to herein as the "abrasion resistance index") and tensile strength as measured in the laboratory.

To verify that the tensile strength and abrasion resistance index provide a reliable estimate tire wear resistance under actual service conditions, real word tire testing was done. By comparing the results of the real world tire testing with the laboratory measured tensile strength and abrasion resistance, then the validity of the predictions regarding wear and durability performance made by the aforementioned laboratory tests can be verified.

As can be seen in Table XIII, both of the tire wear tests indicated that the Rubber Composition 1 has superior wear properties than Rubber Composition 2. In a like manner, the tensile strength and the abrasion resistance index of Rubber Composition 1 are superior to that of Rubber Composition 2. Thus, according to the laboratory measurements, Rubber Composition 1 is more wear resistant and has stronger durability performance to that of Rubber Composition 2, and this finding, based on laboratory measurements, is validated by real world testing under actual service conditions.

Thus, the Rubber Composition formulated with a high density filler (e.g., barium sulfate) and carbon black, Rubber Composition 2, does have improved wet traction and comparable rolling resistance to the Rubber Composition having a HDS silica filler, Rubber Composition 1. However, this wet traction and rolling resistance performance was obtained at the cost of an unacceptable loss in treadwear resistance. Finally, it is important to note a surprising observation that can be gleaned from the data in Table XIII: for the composition incorporating the barium sulfate high density filler, the laboratory DMA data for the rolling resistance did not correlate with the rolling resistance measured using tire testing techniques under real-world conditions. By contrast, the laboratory DMA data for the wet traction did correlate with the wet traction measured using tire testing techniques under real world conditions.

(this is Rubber Composition 4), and equal volume replacement of a silica barium sulfate composite containing a "dense phase silica" coated barium sulfate and prepared according to Example 5 of the present invention (this is Rubber Composition 5).

As can be seen in Table XIV, Rubber Composition 5 (the Rubber Composition containing barium sulfate composite pigment/material as prepared according to the present invention) had wear and durability performance superior to the Rubber Composition containing plain barium sulfate, although the wear and durability performance of Rubber Composition 3 were superior to those of Rubber Composition 5. As can also be seen, the wet traction performance of all of these materials (as measured by the tan at $T_g$, and tan at 0° C.) and the rolling resistance (as measured by the tan at 60° C. by both the ARES and the RPA devices) are roughly comparable.

TABLE XIV

|  | Rubber Composition 3 | Rubber Composition 4 | Rubber Composition 5 |
|---|---|---|---|
| Rheometer @ 160° C., 3° arc, 30 min |  |  |  |
| $M_L$ (lbfin) | 7.9 | 5.4 | 5.9 |
| $M_H$ (lbfin) | 55.5 | 47.1 | 48.7 |
| $t_s2$ (min) | 5.2 | 3.8 | 3.7 |
| t' 50 (min) | 7.8 | 5.2 | 4.9 |
| t' 90 (min) | 13.3 | 6.9 | 6.6 |
| Mooney Viscosity |  |  |  |
| ML 1 + 4 @ 100° C. (MU) | 58 | 33 | 39 |
| Shore A Hardness | 69 | 58 | 62 |
| RPA |  |  |  |
| Tan Delta 60° C., 1% DSA, 1 Hz | 0.127 | 0.085 | 0.093 |
| G* 60° C., 1% DSA,1 Hz (kPa) | 3117 | 1258 | 1494 |
| ΔG* (0.28%ϵ–50%ϵ) 45° C., 1 Hz. (kPa) | 3975 | 692 | 959 |
| DIN Abrasion: Cure: T90 + 5 mins. @ 160° C. |  |  |  |
| Abrasion Resistance Index | 152 | 86 | 101 |
| Molded Groove Tear: Cure: T90 + 5 min. @ 160° C. |  |  |  |
| Tear Strength (lbs/in.) | 66 | 37 | 47 |
| Tear, Die C; Cure: T90 + 5 mins. @ 160° C. |  |  |  |
| Tear Strength (N/cm) | 403 | 240 | 302 |
| Tensile: Cure: T90 + 5 mins. @ 160° C. |  |  |  |
| $T_{10}$ (MPa) | 0.8 | 0.6 | 0.6 |
| $T_{50}$ (MPa) | 1.5 | 1.0 | 1.1 |
| $T_{100}$ (MPa) | 2.4 | 1.4 | 1.7 |
| $T_{200}$ (MPa) | 5.4 | 2.3 | 3.8 |
| $T_{300}$ (MPa) | 9.6 | 4.1 | 6.9 |
| Tensile Strength (MPa) | 18.0 | 11.5 | 14.0 |
| Breaking Elongation (%) | 484 | 561 | 531 |
| Modulus Ratio |  |  |  |
| $T_{200}/T_{50}$ | 362% | 235% | 332% |
| $T_{300}/T_{100}$ | 407% | 299% | 397% |
| Ares Dynamic Mechanical Properties |  |  |  |
| Tan Delta @ Tg Ares Temp. Step 0.5% DSA | 0.826 | 1.089 | 1.029 |
| Tg (° C.) | −38 | −38 | −38 |
| Tan Delta 0° C. 0.5% DSA | 0.169 | 0.128 | 0.137 |
| J" 0° C. 0.5% DSA (1/MPa) | 0.011 | 0.022 | 0.018 |
| Tan Delta 60° C. 0.5% DSA | 0.127 | 0.08 1 | 0.095 |
| J" 60° C. 0.5% DSA (1/MPa) | 0.015 | 0.02 1 | 0.020 |

In Table XIV, the performance of Rubber Compositions 3–5 were compared. Rubber Composition 3, contains Zeopol® 8715 silica filler. This Rubber Composition was compared with identical Rubber Compositions with an equal volume replacement of plain barium sulfate, Huberbrite 1, Thus, when the overall performance—i.e., a combination of these three properties: wet traction, rolling resistance, and wear and durability—is considered, replacing the plain barium sulfate in Rubber Composition 4, with the barium sulfate-silica composite material of Rubber Composition 5 provides a Rubber Composition with better overall performance.

TABLE XV

| | Rubber Composition 6 | Rubber Composition 7 |
|---|---|---|
| Rheometer @ 160° C., 3° arc, 30 min | | |
| $M_L$ (lbfin) | 6.5 | 4.7 |
| $M_H$ (lbfin) | 50.4 | 45.3 |
| $t_s2$ (min) | 9.4 | 6.7 |
| t' 50 (min) | 14.3 | 8.2 |
| t' 90 (min) | 20.9 | 9.0 |
| Mooney Viscosity | | |
| ML 1 + 4 @ 100° C. (MU) | 77 | 68 |
| Shore A Hardness | 65 | 60 |
| RPA | | |
| Tan Delta 60° C., 1% DSA, 1 Hz | 0.074 | 0.064 |
| G* 60° C., 1% DSA, 1 Hz (kPa) | 1300 | 1001 |
| ΔG* (0.28%ϵ–50%ϵ) 45° C., 1 Hz. (kPa) | 597 | 279 |
| DIN Abraison: Cure: T90 + 5 min. @ 160° C. | | |
| Abrasion Resistance Index | 108 | 74 |
| Tear Resistance (lbs/in.) | 30 | 24 |
| Crescent C Tear: Cure: T90 + 5 mins. @ 160° C. | | |
| Average (N/cm) | 248 | 178 |
| Tensile: Cure: T90 + 5 mins. @ 160° C. | | |
| $T_{10}$ (MPa) | 0.6 | 0.6 |
| $T_{50}$ (MPa) | 1.2 | 1.0 |
| $T_{100}$ (MPa) | 1.9 | 1.5 |
| $T_{200}$ (MPa) | 4.2 | 3.2 |
| $T_{300}$ (MPa) | 6.7 | 5.0 |
| Tensile Strength (MPa) | 8.3 | 5.1 |
| Breaking Elongation (%) | 368 | 304 |
| Modulus Ratio | | |
| $T_{200}/T_{50}$ | 353% | 313% |
| $T_{300}/T_{100}$ | 351% | 323% |
| Ares Dynamic Mechanical properties: | | |
| Tan Delta @ Tg Ares Temp. Step 0.5% DSA | 1.118 | 1.288 |
| Tg (° C.) | −38.0 | −38.0 |
| Tan Delta 0° C. 0.5% DSA | 0.123 | 0.093 |
| J" 0° C. 0.5% DSA (1/MPa) | 0.0199 | 0.0233 |
| Tan Delta 60° C. 0.5% DSA | 0.074 | 0.057 |
| J" 60° C. 0.5% DSA (1/MPa) | 0.0175 | 0.0186 |

In Table XV, the performance of Rubber Compositions 6–7 was compared. Rubber Composition 6 contains the barium sulfate composite material at 30 wt % silica (i.e., the composite material is composed of 30 wt % silica), while Rubber Composition 7 contains the barium sulfate composite material at 15 wt % silica. As can be seen in Table XV, the increase in the silica content of the composite material in Rubber Composition 6 resulted in this Rubber Composition having better wear and durability properties (as seen in the tensile strength and abrasion resistance index) than Composition 7.

TABLE XVI

| | Rubber Composition 8 | Rubber Composition 9 | Rubber Composition 10 | Rubber Composition 11 |
|---|---|---|---|---|
| Rheometer @ 160° C., 3° arc, 30 min | | | | |
| $M_L$ (lbfin) | 4.6 | 4.6 | 6.3 | 7.4 |
| $M_H$ (lbfin) | 40.5 | 41.5 | 45.8 | 52.1 |
| $t_s2$ (min) | 6.2 | 6.1 | 8.1 | 9.7 |
| t' 50 (min) | 7.7 | 7.6 | 10.0 | 11.7 |
| t' 90 (min) | 8.3 | 8.3 | 11.1 | 12.7 |
| Mooney Viscosity | | | | |
| ML 1 + 4 @ 100° C.(MU) | 25 | 25 | 38 | 42 |
| Shore A Hardness | 52 | 54 | 58 | 59 |
| RPA | | | | |
| Tan Delta 60° C., 1% DSA, 1 Hz | 0.068 | 0.068 | 0.064 | 0.072 |
| G* 60° C., 1% DSA, 1 Hz (kPa) | 628 | 628 | 830 | 1033 |
| ΔG* (0.28%ϵ–50%ϵ) 45° C., 1 Hz. (kPa) | 147 | 118 | 186 | 347 |
| DIN Abraison: Cure: T90 + 5 mins. @ 160° C. | | | | |
| Abrasion Resistance Index | 74 | 78 | 84 | 106 |
| Molded Groove Tear: Cure: T90 + 5 min @ 160° C. | | | | |
| Tear Resistance (lbs/in.) | 14 | 10 | 7 | 25 |
| Tensile: Cure: T90 + 5 mins. @ 160° C. | | | | |
| $T_{10}$ (MPa) | 0.5 | 0.5 | 0.5 | 0.6 |
| $T_{50}$ (MPa) | 0.7 | 0.7 | 0.9 | 1.0 |
| $T_{100}$ (MPa) | 0.9 | 0.9 | 1.3 | 1.5 |
| $T_{200}$ (MPa) | 1.0 | 1.2 | 2.5 | 3.1 |
| $T_{300}$ (MPa) | 1.3 | 1.5 | 4.2 | 5.6 |

TABLE XVI-continued

|  | Rubber Composition 8 | Rubber Composition 9 | Rubber Composition 10 | Rubber Composition 11 |
|---|---|---|---|---|
| Tensile Strength (MPa) | 2.2 | 2.4 | 4.2. | 8.3 |
| Breaking Elongation (%) | 476 | 453 | 297 | 393 |
| Modulus Ratio |  |  |  |  |
| $T_{200}/T_{50}$ | 144% | 160% | 264% | 302% |
| $T_{300}/T_{100}$ | 146% | 168% | 322% | 379% |
| Ares Dynamic Mechanical Properties |  |  |  |  |
| Tan Delta @ Tg Ares Temp. Step 0.5% DSA | 1.256 | 1.251 | 1.235 | 1.082 |
| Tg (° C.) | −38 | −38 | −38 | −38 |
| Tan Delta 60° C. 0.5% DSA | 0.022 | 0.017 | 0.012 | 0.017 |
| J" 60° C. 0.5% DSA (1/MPa) | 0.053 | 0.049 | 0.038 | 0.064 |

In Table XVI, the performance of Rubber Compositions 8–11 were compared. Rubber Composition 8 contains plain barium sulfate filler, Rubber Composition 9 contains silane-treated barium sulfate material, Rubber Composition 10 contains a barium sulfate-silica composite with 15 wt % silica, and finally Rubber Composition 11 contains a barium sulfate-silica composite with 32.5 wt % silica.

The barium sulfate-silica composite-containing Rubber Compositions (10 and 11) had substantially better wear and durability properties (e.g., tensile strength and abrasion resistance index) than the Rubber Compositions containing barium sulfate (8 and 9). These improved strength properties obtained with the composite material prepared according to the present invention came without any significant compromise in the rolling resistance and wet traction performance, which was comparable across all of the compositions 8–11, except that the relatively lower value of tan at $T_g$ indicates that using silica in the barium sulfate-silica composite at a level as high as 32.5 wt % may compromise the wet traction performance of the material.

TABLE XVII

|  | Rubber Composition 12 | Rubber Composition 13 | Rubber Composition 14 | Rubber Composition 15 |
|---|---|---|---|---|
| Rheometer @ 160° C., 3° arc, 30 min |  |  |  |  |
| $M_L$ (lbfin) | 18.6 | 9.0 | 9.8 | 11.9 |
| $M_H$ (lbfin) | 49.8 | 39.9 | 43.3 | 44.2 |
| $t_s2$ (min) | 2.8 | 4.7 | 4.7 | 4.0 |
| t' 50 (min) | 6.0 | 6.8 | 6.9 | 6.6 |
| t' 90 (min) | 32.3 | 13.3 | 11.3 | 21.7 |
| Mooney Viscosity |  |  |  |  |
| ML 1 + 4 @ 100° C. (MU) | 127 | 59 | 63 | 83 |
| Shore A Hardness | 79 | 70 | 70 | 74 |
| RPA |  |  |  |  |
| Tan Delta 60° C., 1% DSA, 1 Hz | 0.154 | 0.161 | 0.148 | 0.169 |
| G* 60° C., 1% DSA, 1 Hz (kPa) | 3849 | 2002 | 2245 | 2543 |
| ΔG* (0.28%ε–50%ε) 45° C., 1 Hz. (kPa) | 8523 | 2689 | 3101 | 4321 |
| DIN Abrasion: Cure: T90 + 5 mins. @ 160° C. |  |  |  |  |
| Abrasion Resistance Index | 113 | 89 | 99 | 99 |
| Molded Groove Tear: Cure: T90 + 5 min. @ 160° C. |  |  |  |  |
| Tear Resistance (lbs/in.) | 67 | 74 | 81 | 64 |
| Tensile: Cure: T90 + 5 mins. @ 160° C. |  |  |  |  |
| $T_{10}$ (MPa) | 1.1 | 0.7 | 0.8 | 0.9 |
| $T_{50}$ (MPa) | 1.9 | 1.2 | 1.5 | 1.5 |
| $T_{100}$ (MPa) | 2.9 | 1.8 | 2.4 | 2.4 |
| $T_{200}$ (MPa) | 5.4 | 3.2 | 4.6 | 4.7 |
| $T_{300}$ (MPa) | 8.3 | 4.8 | 7.2 | 7.4 |
| Tensile Strength (MPa) | 14.5 | 12.4 | 14.3 | 13.8 |
| Breaking Elongation (%) | 460 | 587 | 545 | 506 |
| Modulus Ratio |  |  |  |  |
| $T_{200}/T_{50}$ | 282% | 266% | 315% | 308% |
| $T_{300}/T_{100}$ | 282% | 274% | 305% | 304% |

TABLE XVII-continued

|  | Rubber Composition 12 | Rubber Composition 13 | Rubber Composition 14 | Rubber Composition 15 |
| --- | --- | --- | --- | --- |
| Ares Dynamic Mechanical Properties |  |  |  |  |
| Tan Delta @ Tg Ares Temp. Step 0.5% DSA | 0.600 | 0.811 | 0.770 | 0.787 |
| Tg (° C.) | −38 | −38 | −38 | −38 |
| Tan Delta 60° C. 0.5% DSA | 0.150 | 0.132 | 0.139 | 0.128 |
| J" 60° C. 0.5% DSA (1/MPa) | 0.012 | 0.019 | 0.018 | 0.017 |

In Tables XVII–XVIII, the performance of Rubber Compositions 12–17 was compared. Rubber Composition 12 contains highly-dispersible silica. This Rubber Composition was then compared with identical Rubber Compositions in which a portion of the highly-dispersible silica has been removed and replaced with an equal volume replacement of another filler material. In Rubber Composition 13, the highly-dispersible silica was replaced with an equal volume of plain barium sulfate, Huberbrite® 1. In each of Rubber Compositions 12–17, the highly-dispersible silica was replaced with an equal volume of several different silica barium sulfate composites. Each of these different silica barium sulfate composites contains a different amount of silica and has a different surface area.

The silica barium sulfate composite-containing Rubber Compositions (14, 15–17) had substantially better wear and durability properties (e.g., tensile strength and abrasion resistance index) than the Rubber Composition containing barium sulfate, composition 13. Additionally, the wear and durability properties of the silica barium sulfate composite-containing Rubber Compositions were comparable to the wear and durability performance of the Rubber Composition containing highly dispersible silica, composition 12. Generally, in the case of compositions 14, 15–17, the wear and durability properties improved with increasing silica content and surface area (Composition 12 had the least surface area and the lowest concentration of silica, while Composition 17 has the most surface area and the highest concentration of silica).

Along with this improved wear and durability performance, the silica barium sulfate composite-containing Rubber Compositions also showed excellent rolling resistance and wet traction performance. Although the somewhat higher values of tan at 60° C. suggest that using a silica barium sulfate composite material having a relatively high surface area and silica concentration may compromise the rolling resistance performance.

TABLE XVIII

|  | Rubber Composition 16 | Rubber Composition 17 | Rubber Composition 18 | Rubber Composition 19 |
| --- | --- | --- | --- | --- |
| Rheometer @ 160° C., 3° arc, 30 min |  |  |  |  |
| $M_L$ (lbfin) | 11.8 | 14.3 | 7.9 | 8.7 |
| $M_H$ (lbfin) | 43.0 | 44.2 | 49.0 | 48.3 |
| $t_s2$ (min) | 4.1 | 3.3 | 1.9 | 1.8 |
| t' 50 (min) | 6.8 | 6.2 | 2.7 | 2.7 |
| t' 90 (min) | 23.2 | 28.5 | 12.3 | 17.1 |
| Mooney Viscosity |  |  |  |  |
| ML 1 + 4 @ 100° C. (MU) | 80 | 94 | 52 | 56 |
| Shore A Hardness | 75 | 75 | 74 | 74 |
| RPA |  |  |  |  |
| Tan Delta 60° C., 1% DSA, 1 Hz | 0.170 | 0.163 | 0.155 | 0.160 |
| G* 60° C., 1% DSA, 1 Hz (kPa) | 2727 | 2778 | 2979 | 3228 |
| ΔG* (0.28%ϵ–50%ϵ) 45° C., 1 Hz. (kPa) | 4905 | 5120 | 3857 | 4352 |
| DIN Abrasion: Cure: T90 + 5 mins. @ 160° C. |  |  |  |  |
| Abrasion Resistance Index | 107 | 110 | 121 | 124 |
| Molded Groove Tear: Cure: T90 + 5 min. @ 160° C. |  |  |  |  |
| Tear Resistance (lbs/in.) | 64 | 66 | 52 | 61 |
| Tensile: Cure: T90 + 5 mins. @ 160° C. |  |  |  |  |
| $T_{10}$ (MPa) | 0.8 | 0.9 | 0.8 | 0.9 |
| $T_{50}$ (MPa) | 1.6 | 1.6 | 1.7 | 1.8 |
| $T_{100}$ (MPa) | 2.5 | 2.6 | 3.0 | 3.2 |
| $T_{200}$ (MPa) | 4.8 | 4.9 | 6.5 | 7.1 |
| $T_{300}$ (MPa) | 7.4 | 7.7 | 11.0 | 11.8 |

TABLE XVIII-continued

|  | Rubber Composition 16 | Rubber Composition 17 | Rubber Composition 18 | Rubber Composition 19 |
|---|---|---|---|---|
| Tensile Strength (MPa) | 13.1 | 14.0 | 17.0 | 17.0 |
| Breaking Elongation (%) | 484 | 485 | 438 | 403 |
| Modulus Ratio |  |  |  |  |
| $T_{200}/T_{50}$ | 306% | 303% | 374% | 393% |
| $T_{300}/T_{100}$ | 293% | 300% | 362% | 372% |
| Ares Dynamic Mechanical Properties |  |  |  |  |
| Tan Delta @ Tg Ares Temp. Step 0.5% DSA | 0.714 | 0.752 | 0.770 | 0.769 |
| Tg (° C.) | −38 | −38 | −38 | −38 |
| Tan Delta 60° C. 0.5% DSA | 0.147 | 0.142 | 0.135 | 0.137 |
| J" 60° C. 0.5% DSA (1/MPa) | 0.016 | 0.017 | 0.015 | 0.016 |

In Table XVIII, the performance of two practical rubber formulations, Rubber Compositions 18–19 was compared. Rubber Composition 18 contains a blend of carbon black and plain barium sulfate, Huberbrite 1, while Rubber Composition 19 is an identical formulation, but in which the plain barium sulfate has been replaced with an equal volume of silica barium sulfate composite prepared according to Example 1 of the present invention. These two compositions can in turn be compared with composition 12, which is identical to compositions 18 and 19, except that for composition 12 highly-dispersible silica is used, but no carbon black is used.

As can be seen in Table XVIII, the differences between the samples are somewhat subtle, but still indicate that Rubber Composition made with the silica barium sulfate composite materials of the present invention are superior to Rubber Composition using prior art fillers. The wear and durability performance (e.g., tensile strength, abrasion resistance index, modulus ratio, Payne effect) of Rubber Composition 19 was better than Rubber Composition 23 and significantly better than that of Rubber Composition 12. The tan at 60° C. and the tan at $T_g$ are relatively similar for both Rubber Composition 18 and Rubber Composition 19 indicating that one would expect similar wet traction and rolling resistance performance for these compositions. When the tan at 60° C. and the tan at $T_g$ of composition 19 are compared with the comparable vales for composition 12, it is indicated that the Rubber Composition 19 will have significantly better wet traction and rolling resistance performance.

TABLE XIX

|  | 20 | 21 | 22 |
|---|---|---|---|
| Multi-Segment Retreaded Tire Wear Testing |  |  |  |
| Wear Resistance Index @ 10,000 Miles | 100% | 98% | 96% |
| Rheometer @ 160° C., 3° are, 30 min |  |  |  |
| $M_L$ (lbfin) | 11.8 | 11.0 | 12.0 |
| $M_H$ (lbfin) | 50.2 | 55.5 | 54.1 |
| $t_s2$ (min) | 4.7 | 4.2 | 4.8 |
| t' 50 (min) | 6.6 | 5.5 | 6.5 |
| t' 90 (min) | 9.2 | 7.7 | 9.1 |
| t' 50/$t_s2$ Ratio | 1.4 | 1.3 | 1.4 |

TABLE XIX-continued

|  | 20 | 21 | 22 |
|---|---|---|---|
| Mooney Viscosity |  |  |  |
| ML 1 + 4 @ 100° C. (MU) | 70 | 79 | 76 |
| ML 1 + 4 @ 100° C., Aged 4 Days (MU) | 88 | 81 | 77 |
| Shore A Hardness | 70 | 70 | 70 |
| RPA |  |  |  |
| Tan Delta 60° C., 1% DSA, 1 Hz | 0.153 | 0.156 | 0.172 |
| G* 60° C., 1% DSA, 1 Hz (kPa) | 2666 | 3861 | 5003 |
| ΔG* (0.28%ϵ–50%ϵ) 45° C., 1 Hz. (kPa) | 4479 | 5326 | 7889 |
| Ares Dynamic Mechanical Properties |  |  |  |
| Tan Delta @ Tg Ares Temp. Step 0.5% DSA | 0.768 | 0.829 | 0.800 |
| $T_g$ (° C.) | −38 | −38 | −38 |
| DIN Abrasion: Cure: T90 + 5 mins. @ 160° C. |  |  |  |
| Abrasion Resistance Index | 156 | 149 | 139 |
| Tensile: Cure: T90 + 5 mins. @ 160° C. |  |  |  |
| $T_{10}$ (MPa) | 1.4 | 1.6 | 1.5 |
| $T_{50}$ (MPa) | 2.3 | 3.0 | 3.0 |
| $T_{100}$ (MPa) | 3.8 | 5.8 | 6.0 |
| $T_{200}$ (MPa) | 8.5 | 11.7 | 13.4 |
| $T_{300}$ (MPa) | 14.2 | 17.1 | 19.6 |
| Tensile Strength (MPa) | 18.7 | 19.5 | 19.7 |
| Breaking Elongation (%) | 381 | 320 | 301 |
| Modulus Ratio |  |  |  |
| $T_{200}/T_{50}$ | 373% | 386% | 454% |
| $T_{300}/T_{100}$ | 369% | 294% | 328% |

In Table XIX, the performance of Rubber Compositions 20–22 was compared. Rubber Composition 20 contains Zeopol 8755 highly dispersible silica. Rubber Composition 21 was manufactured by use of a parallel mixing stage technique discussed in greater detail above and contains a filler blend of carbon black and silica barium sulfate composite material prepared according to example 7 of the present invention. Rubber Composition 22 contains carbon black but neither silica nor silica barium sulfate composite filler material.

As can be seen in Table XIX, the wear and durability performance was comparable all across all three Rubber Compositions. This was true both for the actual, in-service tire testing, done over a service period of 10,000 miles, and for the laboratory measured properties (e.g., tensile strength, abrasion resistance index, etc.). The tan at 60° C. is lower for Rubber Composition 21 than for Rubber Composition 20 indicating that Rubber Compositions containing the silica barium sulfate filler composition prepared according to the present invention have superior rolling resistance performance. Similarly, the tan at $T_g$ for Rubber Composition 21 is higher than that of Rubber Composition 20 indicating that Rubber Composition 21 has better wet traction performance.

TABLE XX

|  | Rubber Composition 23 | Rubber Composition 24 | Rubber Composition 25 | Rubber Composition 26 |
|---|---|---|---|---|
| Multi-Segment Retreaded Tire Wear Testing | | | | |
| Wear Resistance Index @ 20,000 Miles | 100% | 100% | 98% | 98% |
| Rheometer @ 160° C., 3° arc, 30 min | | | | |
| $M_L$ (lbfin) | 9.0 | 8.4 | 8.4 | 8.6 |
| $M_H$ (lbfin) | 46.8 | 50.2 | 48.3 | 48.7 |
| $t_s2$ (min) | 3.2 | 4.4 | 4.6 | 3.9 |
| t' 50 (min) | 5.2 | 5.7 | 5.9 | 5.1 |
| t' 90 (min) | 11.1 | 7.5 | 7.5 | 7.0 |
| t' 50/$t_s$2 Ratio | 1.6 | 1.3 | 1.3 | 1.3 |
| Mooney Viscosity | | | | |
| ML 1 + 4 @ 100° C. (MU) | 64 | 67 | 63 | 68 |
| Shore A Hardness | 69 | 69 | 68 | 69 |
| RPA | | | | |
| Tan Delta 60° C., 1% DSA, 1 Hz | 0.159 | 0.157 | 0.162 | 0.168 |
| G* 60° C., 1% DSA,1 Hz (kPa) | 2636 | 3291 | 2928 | 3857 |
| ΔG* (0.28%ε–50%ε) 45° C., 1 Hz. | 4673 | 3753 | 3438 | 5416 |
| Ares Dynamic Mechanical Properties | | | | |
| Tan Delta @ Tg Ares Temp. Step 0.5% DSA | 0.755 | 0.863 | 0.890 | 0.849 |
| Tg (° C.) | −38 | −38 | −38 | −38 |
| DIN Abrasion: Cure: T90 + 5 min. @ 160° C. | | | | |
| Abrasion Resistance Index | 153 | 138 | 144 | 145 |
| Molded Groove Tear: Cure: T90 + 5 min. @ 160° C. | | | | |
| Tear Resistance (lbs/in.) | 69 | 54 | 91 | 64 |
| Tensile: Cure: T90 + 5 mins. @ 160° C. | | | | |
| $T_{10}$ (MPa) | 1.1 | 1.1 | 1.0 | 1.2 |
| $T_{50}$ (MPa) | 1.8 | 2.0 | 1.8 | 2.1 |
| $T_{100}$ (MPa) | 2.6 | 3.6 | 3.0 | 3.8 |
| $T_{200}$ (MPa) | 5.2 | 8.8 | 7.6 | 9.2 |
| $T_{300}$ (MPa) | 8.9 | 14.5 | 13.0 | 15.0 |
| Tensile Strength (MPa) | 17.7 | 19.4 | 20.2 | 18.9 |
| Breaking Elongation (%) | 498 | 398 | 457 | 376 |
| Modulus Ratio | | | | |
| $T_{200}/T_{50}$ | 295% | 439% | 434% | 437% |
| $T_{300}/T_{100}$ | 346% | 399% | 427% | 396% |
| Tensile: Cure: T90 + 5 mins. @ 160° C.; Aged 48 Hrs @ 100° C. | | | | |
| $T_{10}$ (MPa) | 1.1 | 1.0 | 1.0 | 1.1 |
| $T_{50}$ (MPa) | 2.1 | 2.5 | 2.3 | 2.7 |
| $T_{100}$ (MPa) | 3.3 | 5.0 | 4.5 | 5.3 |
| $T_{200}$ (MPa) | 7.0 | 11.7 | 11.2 | 12.5 |
| $T_{300}$ (MPa) | 12.2 | 17.2 | 17.7 | 18.9 |
| Tensile Strength (MPa) | 17.6 | 18.0 | 18.9 | 19.3 |
| Breaking Elongation (%) | 498 | 299 | 321 | 306 |
| Modulus Ratio | | | | |
| $T_{200}/T_{50}$ | 334% | 463% | 484% | 471% |
| $T_{300}/T_{100}$ | 369% | 346% | 393% | 359% |

In Table XX, the performance of Rubber Compositions 23–26 were compared. Rubber Composition 23 contains highly dispersible silica (and no carbon black). Rubber Composition 24 was manufactured by use of a parallel mixing stage technique discussed in greater detail above and contains a silica barium sulfate composite with 32.5 wt % silica. Rubber Composition 25 was also manufactured by use of a parallel mixing stage technique discussed in greater detail above and contains a silica barium sulfate composite with 50 wt % silica and both of these compositions contain carbon black. As above in the Rubber Compositions compared in Table XIX, there is also a Rubber Composition which contains carbon black but neither a highly dispersible silica nor a silica barium sulfate composite material, this is Rubber Composition 26.

As can be seen in Table XX, the wear and durability performance was comparable across all four Rubber Compositions. This was true both for the actual, in-service tire testing, done over a service period of 20,000 miles, and for the laboratory measured properties (e.g., tensile strength, abrasion resistance index, etc.). The tan at 60° C. is comparable for both Rubber Compositions 24 and 25 as well as Rubber Composition 23, indicating that all of these compositions have similar rolling resistance performance. The tan at 60° C. for Rubber Composition 26 was somewhat higher, indicating that a tire made from this Rubber Composition would have higher rolling resistance.

The tan at $T_g$ for Rubber Compositions 24 and 26 was appreciably higher than for Rubber Compositions 23 or 26 indicating that Rubber Compositions 24 and 26 would have better wet traction performance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A Rubber Composition comprising a rubber and a composite pigment composition, the composite pigment including a dense inorganic material and silica, wherein the pigment composition has:

a CTAB surface area of greater than about 20 m²/g;

a BET surface area of greater than about 25 m²/g; and a density of greater than about 2.5 g/cm³.

2. The Rubber Composition according to claim 1, wherein the Rubber Composition comprises a copolymer of a conjugated diene and an aromatic vinyl compound.

3. The Rubber Composition according to claim 1, wherein the Rubber Composition comprises other ingredients selected from the group consisting of fillers, elastomers, processing aids, coupling agents, vulcanization agents, vulcanization activators, and antidegradants.

4. The Rubber Composition according to claim 1, wherein the dense inorganic material comprises a substance selected from the group consisting of zinc, zinc oxide, copper sulfide, tungsten oxide, zinc sulfate, zinc sulfide, and barium sulfate.

5. The Rubber Composition according to claim 1, wherein the dense inorganic material comprises barium sulfate.

6. The Rubber Composition according to claim 5, wherein the barium sulfate is coated with precipitated amorphous silica.

7. The Rubber Composition according to claim 1, wherein the pigment composition comprises about 5 wt % to about 70 wt % silica, and about 30 wt % to about 95 wt % barium sulfate, based on the total weight of the pigment composition.

8. The Rubber Composition according to claim 1, wherein the pigment composition has a density of about 2.5 g/cm³ to about 13 g/cm³.

9. The Rubber Composition according to claim 1, wherein the BET surface area is about 100% to about 120% of the CTAB surface area.

10. The pigment composition of claim 1, wherein the silica is precipitated amorphous silica.

11. The Rubber Composition according to claim 1, wherein the pigment composition has a density of about 2.8 g/cm³ to about 4.9 g/cm³.

12. A pneumatic tire including a tread, the tread containing a Rubber Composition comprising a rubber and a composite pigment composition, the composite pigment including a dense inorganic material and silica, wherein the pigment composition has:

a CTAB surface area of greater than about 20 m²/g;

a BET surface area of greater than about 25 m²/g; and a density of greater than about 2.5 g/cm³.

13. A Rubber Composition comprising a rubber and a composite pigment composition, the composite pigment containing about 5 wt % to about 70 wt % silica, and about 30 wt % to about 95 wt % barium sulfate, based on the total weight of the pigment composition, wherein the pigment has:

a CTAB surface area of greater than about 20 m²/g;

a BET surface area of greater than about 25 m²/g; and a density of greater than about 2.5 g/cm³.

14. The Rubber Composition according to claim 1, wherein the dense inorganic material comprises titanium dioxide.

* * * * *